US010427322B2

(12) United States Patent
Suzuki et al.

(10) Patent No.: US 10,427,322 B2
(45) Date of Patent: Oct. 1, 2019

(54) LIGHT-ABSORBING MATERIAL FLYING APPARATUS, METHOD FOR FLYING LIGHT-ABSORBING MATERIAL, AND APPLICATIONS USING SAME

(71) Applicants: Kazumi Suzuki, Shizuoka (JP); Masaki Yoshino, Kanagawa (JP); Takashige Omatsu, Chiba (JP)

(72) Inventors: Kazumi Suzuki, Shizuoka (JP); Masaki Yoshino, Kanagawa (JP); Takashige Omatsu, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/682,725

(22) Filed: Aug. 22, 2017

(65) Prior Publication Data

US 2017/0348872 A1 Dec. 7, 2017

Related U.S. Application Data

(63) Continuation of application No. PCT/JP2016/055208, filed on Feb. 23, 2016.

(30) Foreign Application Priority Data

Feb. 25, 2015 (JP) .................................. 2015-034707
Feb. 10, 2016 (JP) .................................. 2016-024079

(51) Int. Cl.
*B41J 2/14* (2006.01)
*B28B 1/00* (2006.01)
(Continued)

(52) U.S. Cl.
CPC .............. *B28B 1/001* (2013.01); *B29C 67/00* (2013.01); *B33Y 10/00* (2014.12); *B33Y 30/00* (2014.12);
(Continued)

(58) Field of Classification Search
CPC ......... B33Y 10/00; B33Y 30/00; B29C 67/00; B41J 2/01; B41J 2/04; B41J 2/14; G02B 5/003; G03G 15/224; B28B 1/001
See application file for complete search history.

(56) References Cited

U.S. PATENT DOCUMENTS 5,021,808 A  6/1991 Kohyama
5,754,202 A  5/1998 Sekiya et al.
(Continued)

FOREIGN PATENT DOCUMENTS

JP  61-118273  6/1986
JP  62-184860  8/1987
(Continued)

OTHER PUBLICATIONS

International Search Report dated May 10, 2016 for counterpart International Patent Application No. PCT/JP2016/055208 filed Feb. 23, 2016 (with English Translation).
(Continued)

*Primary Examiner* — Lamson D Nguyen
(74) *Attorney, Agent, or Firm* — Oblon, McClelland, Maier & Neustadt, L.L.P.

(57) ABSTRACT

Provided is a light-absorbing material flying apparatus including: a light-absorbing material that absorbs light; and a light-absorbing material flying section configured to irradiate the light-absorbing material with an optical vortex laser beam corresponding to a light absorption wavelength of the light-absorbing material to fly the light-absorbing material by an energy of the optical vortex laser beam in a direction in which the optical vortex laser beam is emitted to attach the light-absorbing material on an attachment target.

13 Claims, 18 Drawing Sheets

(51) Int. Cl.
  *B29C 67/00* (2017.01)
  *B41J 2/04* (2006.01)
  *G03G 15/22* (2006.01)
  *B33Y 10/00* (2015.01)
  *B33Y 30/00* (2015.01)
  *B41J 2/01* (2006.01)
  *G02B 5/00* (2006.01)

(52) U.S. Cl.
  CPC . *B41J 2/01* (2013.01); *B41J 2/04* (2013.01); *B41J 2/14* (2013.01); *G02B 5/003* (2013.01); *G03G 15/224* (2013.01)

(56) References Cited

U.S. PATENT DOCUMENTS

| | | |
|---|---|---|
| 6,241,344 B1 | 6/2001 | Machida |
| 2005/0212888 A1 | 9/2005 | Lehmann et al. |
| 2014/0226685 A1 | 8/2014 | Omatsu et al. |
| 2016/0107888 A1 | 4/2016 | Omatsu et al. |

FOREIGN PATENT DOCUMENTS

| | | |
|---|---|---|
| JP | 62-191157 | 8/1987 |
| JP | 01-101157 | 4/1989 |
| JP | 04-129747 | 4/1992 |
| JP | 05-077422 | 3/1993 |
| JP | 09-169111 | 6/1997 |
| JP | 11-138773 | 5/1999 |
| JP | 11-245416 | 9/1999 |
| JP | 2005-518965 | 6/2005 |
| JP | 2008-193066 | 8/2008 |
| JP | 2010-247230 | 11/2010 |
| JP | 2012-182257 | 9/2012 |
| WO | WO 2012/169578 A2 | 12/2012 |
| WO | WO 2014-181890 A2 | 11/2014 |

OTHER PUBLICATIONS

Written Opinion dated May 10, 2016 for counterpart International Patent Application No. PCT/JP2016/055208 filed Feb. 23, 2016.
Extended European Search Report dated Mar. 21, 2018 in European Patent Application No. 16755466.6, 7 pages.

LIGHT-ABSORBING MATERIAL FLYING APPARATUS, METHOD FOR FLYING LIGHT-ABSORBING MATERIAL, AND APPLICATIONS USING SAME

CROSS-REFERENCE TO RELATED APPLICATIONS

The present application is a continuation application of International Application No. PCT/JP2016/055208, filed Feb. 23, 2016, which claims priority to Japanese Patent Application No. 2015-034707, filed Feb. 25, 2015 and Japanese Patent Application No. 2016-024079, filed Feb. 10, 2016. The contents of these applications are incorporated herein by reference in their entirety.

BACKGROUND OF THE INVENTION

Field of the Invention

The present invention relates to a light-absorbing material flying apparatus, an image forming apparatus, a three-dimensional object producing apparatus, a method for flying a light-absorbing material, a method for forming an image, and a method for producing a three-dimensional object.

Description of the Related Art

Hitherto, various image forming apparatuses represented by inkjet printing systems and electrophotography systems have been developed.

Among these systems, the inkjet printing systems that allow price saving, running cost saving, and downsizing and have excellent low-noisiness have been used to develop various image forming apparatuses to be sold on the market.

For the image forming apparatuses, methods for forming images with inks that have high viscosities and do not easily bleed have been studied, aiming for versatility to various types of print media. Moreover, because the image forming apparatuses can fly droplets of the inks to desired positions, recently, studies have also been made into applications to the field of 3D printers for producing three-dimensional objects and the field of printed electronics for forming electronic parts by printing techniques, not only to the field of image formation.

In order to achieve these objects, there is a need that not only the inks having low viscosities hitherto used in image formation but also various materials be flown to desired positions accurately, leading to proposals of various image forming apparatuses.

For example, in order to fly an ink having a viscosity of 10 mPa·s or higher but 100 mPa·s or lower, there is proposed an image forming apparatus having a large nozzle diameter in order to suppress the resistance of the ink in flow paths (see, e.g., Japanese Unexamined Patent Application Publication No. 09-169111). There is also proposed an image forming apparatus including a section configured to make the surface of a flat ink bearer bear the ink having a high viscosity in a state of ink droplets, and heat a part of the ink bearer based on image information to fly the ink (see, e.g., Japanese Unexamined Patent Application Publication No. 11-138773).

SUMMARY OF THE INVENTION

According to one aspect of the present invention, a light-absorbing material flying apparatus includes a light-absorbing material that absorbs light, and a light-absorbing material flying section configured to irradiate the light-absorbing material with an optical vortex laser beam corresponding to a light absorption wavelength of the light-absorbing material to fly the light-absorbing material by an energy of the optical vortex laser beam in a direction in which the optical vortex laser beam is emitted to attach the light-absorbing material on an attachment target.

DESCRIPTION OF THE EMBODIMENTS

Figure 1A:
FIG. 1A is a schematic diagram illustrating wave surfaces (equiphase surfaces) of a typical laser beam.

The present invention has an object to provide a light-absorbing material flying apparatus capable of flying, particularly, a light-absorbing material having a high viscosity among light-absorbing materials that absorb light, and making the light-absorbing material attach in a scattering-suppressed shape on an attachment target.

The present invention can provide a light-absorbing material flying apparatus capable of flying, particularly, a light-absorbing material having a high viscosity among light-absorbing materials that absorb light, and making the light-absorbing material attach in a scattering-suppressed shape on an attachment target.

(Light-Absorbing Material Flying Apparatus and Method for Flying Light-Absorbing Material)

A light-absorbing material flying apparatus of the present invention includes a light-absorbing material that absorbs light, and a light-absorbing material flying section configured to irradiate the light-absorbing material with an optical vortex laser beam corresponding to a light absorption wavelength of the light-absorbing material to fly the light-absorbing material by an energy of the optical vortex laser beam in a direction in which the optical vortex laser beam is emitted to attach the light-absorbing material on an attachment target, and further includes other sections as needed.

A method for flying a light-absorbing material of the present invention includes a light-absorbing material flying step of irradiating a light absorbing material that absorbs light with an optical vortex laser beam corresponding to a light absorption wavelength of the light-absorbing material to fly the light-absorbing material by an energy of the optical vortex laser beam in a direction in which the optical vortex laser beam is emitted to attach the light-absorbing material on an attachment target, and further includes other steps as needed.

The method for flying a light-absorbing material can be favorably performed by the light-absorbing material flying apparatus. The light-absorbing material flying step can be favorably performed by the light-absorbing material flying section. The other steps can be performed by the other sections.

The light-absorbing material flying apparatus and the method for flying a light-absorbing material of the present invention are based on a finding that the image forming apparatus described in Japanese Unexamined Patent Application Publication No. 09-169111 needs to have a larger nozzle diameter for an ink having a higher viscosity, leading to a poor resolution because a larger nozzle diameter makes the diameter of ink droplets to be flown relatively large.

The light-absorbing material flying apparatus and the method for flying a light-absorbing material of the present invention are based on a finding that the image forming apparatus described in Japanese Unexamined Patent Application Publication No. 11-138773 may generate variation in the diameter of dots to be formed on the print medium due to fluctuation of the gap between the ink bearer and the print medium, or may generate an image on which the ink is scattered.

The light-absorbing material flying apparatus and the method for flying a light-absorbing material of the present invention are based on a finding that it is difficult for the existing inkjet printing systems to attach the inks having high viscosities on the print media in stable shapes in the field of image formation and to attach various materials in stable shapes in the field of 3D printers.

Figure 1B:
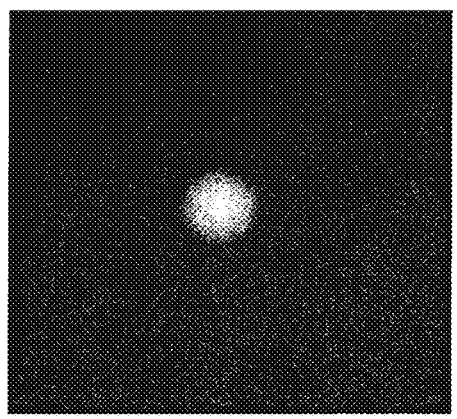
FIG. 1B is a diagram illustrating a light intensity distribution of a typical laser beam.
Figure 1C:
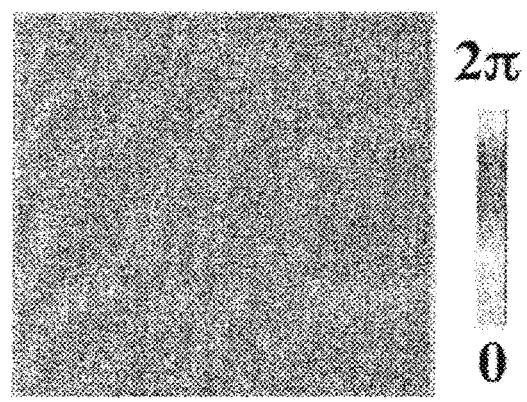
FIG. 1C is a diagram illustrating a phase distribution of a typical laser beam.

A typical laser beam is uniform in phase, and hence has a flat equiphase surface (wave surface) as illustrated in FIG. 1A. The direction of the Poynting vector of the laser beam is a direction orthogonal to the flat equiphase surface. Therefore, when the light-absorbing material is irradiated with the laser beam, a force acts in the light-absorbing material in the direction in which the laser beam is emitted. However, because the light intensity distribution in a cross-section of the laser beam is a normal distribution (Gaussian distribution) in which the center of the beam has the maximum intensity as illustrated in FIG. 1B, the light-absorbing material tends to scatter. Further, when the phase distribution is observed, it can be confirmed that there is no phase difference, as illustrated in FIG. 1C.

Figure 2A:
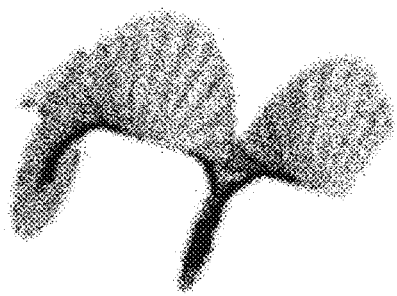
FIG. 2A is a schematic diagram illustrating wave surfaces (equiphase surfaces) of an optical vortex laser beam.
Figure 2B:
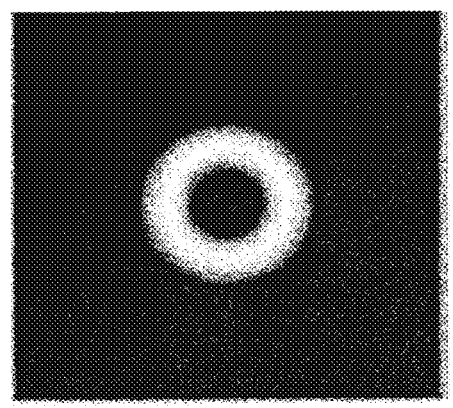
FIG. 2B is a diagram illustrating a light intensity distribution of an optical vortex laser beam.
Figure 2C:
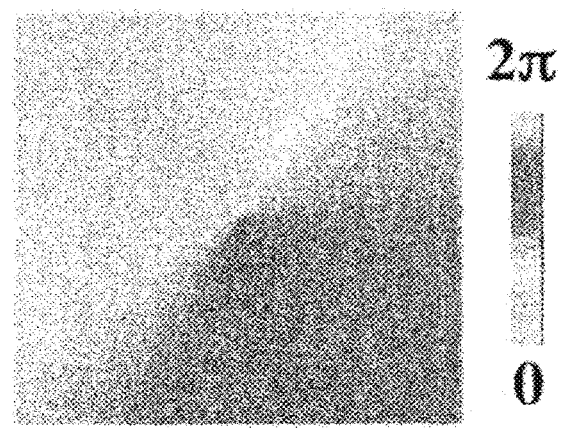
FIG. 2C is a diagram illustrating a phase distribution of an optical vortex laser beam.

As compared, the optical vortex laser beam has a spiral equiphase surface as illustrated in FIG. 2A. The direction of the Poynting vector of the optical vortex laser beam is a direction orthogonal to the spiral equiphase surface. Therefore, when the light-absorbing material is irradiated with the optical vortex laser beam, a force acts in the orthogonal direction. Therefore, the light intensity distribution is a doughnut-shaped distribution in which the center of the beam is zero as illustrated in FIG. 2B. The light-absorbing material that is irradiated with the optical vortex laser beam, i.e., to which the doughnut-shaped energy is applied as a radiation pressure, is flown along the direction in which the optical vortex laser beam is emitted, and attached in a not-easily-scatterable state on the attachment target. Further, when the phase distribution is observed, it can be confirmed that a phase difference occurs, as illustrated in FIG. 2C.

The method for judging whether a laser beam is the optical vortex laser beam or not is not particularly limited and may be appropriately selected depending on the intended purpose. Examples of the method include observation of the phase distribution described above and interferometry. The interferometry is common.

The interferometry is possible with a laser beam profiler (e.g., a laser beam profiler available from Spiricon, Inc. and a laser beam profiler available from Hamamatsu Photonics K.K.). Examples of results of interferometry are illustrated in FIG. 3A and FIG. 3B.

Figure 3A:
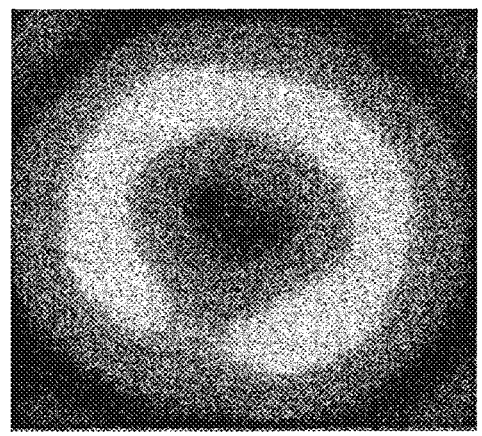
FIG. 3A is a diagram illustrating an example of a result of interferometry of an optical vortex laser beam.

FIG. 3A is a diagram illustrating an example of a result of interferometry of an optical vortex laser beam. FIG. 3B is a diagram illustrating an example of a result of interferometry of a laser beam having a point at which a light intensity is 0 in the center.

When the optical vortex laser beam is measured by interferometry, as illustrated in FIG. 3A, it can be confirmed that the optical vortex laser beam is a laser beam having a doughnut-shaped energy distribution and having a point at which a light intensity is 0 in the center as in FIG. 1C.

Figure 3B:
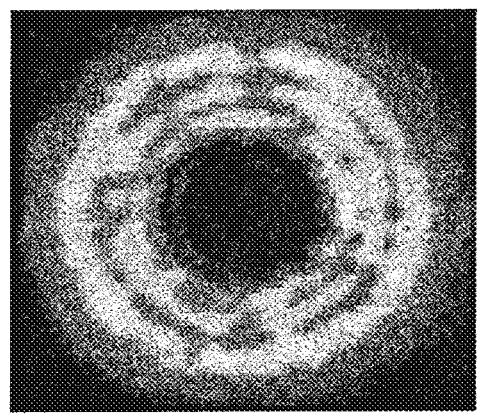
FIG. 3B is a diagram illustrating an example of a result of interferometry of a laser beam having a point at which a light intensity is 0 in the center.

On the other hand, when a typical laser beam having a point at which a light intensity is 0 in the center is measured by interferometry, as illustrated in FIG. 3B, it can be confirmed that an energy distribution, which is similar to the interferometry of the optical vortex laser beam illustrated in FIG. 3A though, is not uniform in the doughnut-shaped portion, making it possible to confirm the difference from the optical vortex laser beam.

<Light-Absorbing Material Flying Section and Light-Absorbing Material Flying Step>

The light-absorbing material flying step is a step of irradiating the light-absorbing material that absorbs light with the optical vortex laser beam corresponding to a light absorption wavelength of the light-absorbing material, to fly the light-absorbing material by an energy of the optical vortex laser beam in a direction in which the optical vortex laser beam is emitted to attach the light-absorbing material on the attachment target. The light-absorbing material flying step can be favorably performed by the light-absorbing material flying section.

The light-absorbing material flying section is a section configured to irradiate the light absorbing material that absorbs light with the optical vortex laser beam corresponding to a light absorption wavelength of the light-absorbing material, to fly the light-absorbing material by an energy of the optical vortex laser beam in a direction in which the optical vortex laser beam is emitted to attach the light-absorbing material on an attachment target.

It is preferable that the light-absorbing material flying section irradiate the light-absorbing material, which is borne on a surface of a light-absorbing material bearer transparent to the light, with the optical vortex laser beam from the back of the light-absorbing material bearer.

Figure 11:
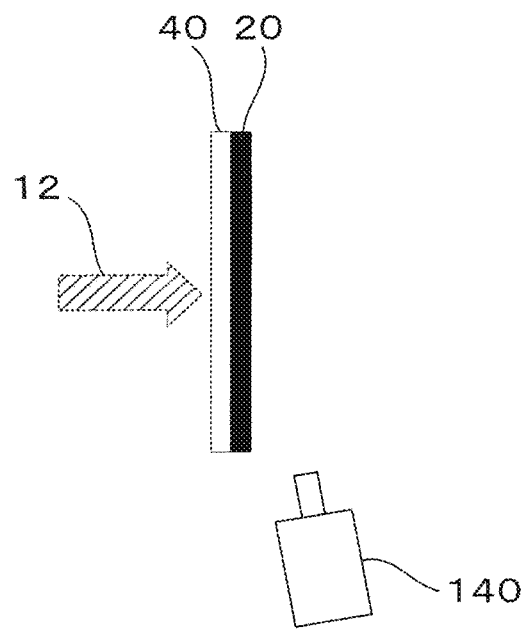
FIG. 11 is an exemplary diagram illustrating an example of a method for measuring a flying state of a light-absorbing material flown by an optical vortex laser beam of a light-absorbing material flying apparatus of the present invention.

A flying state of the light-absorbing material when irradiated with the optical vortex laser beam can be observed by, for example, as illustrated in FIG. 11, irradiating the light-absorbing material 20 borne on the front surface of the light-absorbing material bearer 40 with the optical vortex laser beam 12 from the back of the light-absorbing material bearer 40, and shooting this process with a high-speed camera 140 at 100 ns per 1 frame.

Examples of the high-speed camera include a high-speed camcorder HYPER VISION HPV-X available from Shimadzu Corporation.

The light-absorbing material flying section includes a laser light source and an optical vortex converting section, and preferably further includes other members as needed.

<<Laser Source>>

The laser light source is not particularly limited and may be appropriately selected depending on the intended purpose so long as the laser light source can generate the laser beam. Examples of the laser light source include a solid-state laser, a gas laser, and a semiconductor laser. A laser light source capable of oscillating pulses is preferable.

Examples of the solid-state laser include a YAG laser and a titanium-sapphire laser.

Examples of the gas laser include an argon laser, a helium neon laser, and a carbon dioxide laser.

Among these lasers, the semiconductor laser having an output of about 30 mW is preferable in terms of downsizing and cost-saving of the apparatus. However, in Examples, a titanium-sapphire laser was used experimentally.

The wavelength of the laser beam is not particularly limited, may be appropriately selected depending on the intended purpose, and is preferably from 300 nm or greater but 11 micrometers or less and more preferably 350 nm or greater but 1,100 nm or less.

The beam diameter of the laser beam is not particularly limited, may be appropriately selected depending on the intended purpose, and is preferably from 10 micrometers or greater but 10 mm or less and more preferably 10 micrometers or greater but 1 mm or less.

The pulse width of the laser beam is not particularly limited, may be appropriately selected depending on the intended purpose, and is preferably 2 nanoseconds or longer but 100 nanoseconds or shorter and more preferably 2 nanoseconds or longer but 10 nanoseconds or shorter.

The pulse frequency of the laser beam is not particularly limited, may be appropriately selected depending on the intended purpose, and is preferably 10 Hz or higher but 200 Hz or lower and more preferably 20 Hz or higher but 100 Hz or shorter.

The laser light source may be a laser light source that can output the optical vortex laser beam.

<<Optical Vortex Converting Section>>

The optical vortex converting section is not particularly limited and may be appropriately selected depending on the intended purpose so long as the optical vortex converting section can convert the laser beam to the optical vortex laser beam. Examples of the optical vortex converting section include a diffractive optical element, a multimode fiber, and a liquid-crystal phase modulator.

Examples of the diffractive optical element include a spiral phase plate and a hologram element. Of these diffractive optical elements, a spiral phase plate is preferable.

The method for generating the optical vortex laser beam is not limited to the method using the optical-vortex converting section, and other examples include a method of oscillating an optical vortex from a laser oscillator as an eigenmode, a method of inserting a hologram element in an oscillator, a method of using excitation light converted to a doughnut beam, a method of using a resonator mirror having a scotoma, and a method of oscillating an optical vortex mode utilizing a thermal lens effect generated by a side-pumped solid-state laser as a spatial filter.

In order to stabilize the output of the optical vortex laser beam, it is preferable to arrange a quarter wave plate on the light path downstream of the optical vortex converting section and set the optical axis of the quarter wave plate at an angle of +45 degrees from the optical vortex laser beam, which is linearly-polarized light, to convert the optical vortex laser beam to circularly-polarized light.

<<Other Members>>

The other members are not particularly limited and may be appropriately selected depending on the intended purpose. Examples of the other members include a beam diameter changing member, a beam wavelength changing element, and an energy adjusting filter.

—Beam Diameter Changing Member—

The beam diameter changing member is not particularly limited and may be appropriately selected depending on the intended purpose so long as the beam diameter changing member can change the beam diameter of the laser beam or the optical vortex laser beam. Examples of the beam diameter changing member include a condenser lens.

The beam diameter of the optical vortex laser beam is not particularly limited, may be appropriately selected depending on the intended purpose, and is preferably some micrometers or greater but 10 mm or less because the light-absorbing material has been confirmed to be flown at such a beam diameter. The beam diameter can be changed by a laser spot diameter and a condenser lens.

When the light-absorbing material is a dispersion, the beam diameter is preferably greater than or equal to the maximum volume average particle diameter of the dispersion and more preferably greater than or equal to 3 times as large as the maximum. When the beam diameter is in the more preferable range, there is an advantage that the light-absorbing material can be flown stably.

—Beam Wavelength Changing Element—

The beam wavelength changing element is not particularly limited and may be appropriately selected depending on the intended purpose so long as the beam wavelength changing element can change the wavelength of the laser beam or the optical vortex laser beam to a wavelength that can be absorbed by the light-absorbing material and to which the light-absorbing material bearer described below is transparent. Examples of the beam wavelength changing element include a KTP crystal, a BBO crystal, a LBO crystal, and a CLBO crystal.

—Energy Adjusting Filter—

The energy adjusting filter is not particularly limited and may be appropriately selected depending on the intended purpose so long as the energy adjusting filter can adjust the laser beam or the optical vortex laser beam to an appropriate output value. Examples of the energy adjusting filter include glass.

The energy intensity of the optical vortex laser beam for flying the light-absorbing material corresponding to 1 clot is not particularly limited, may be appropriately selected depending on the intended purpose, and is preferably, 0.1 mJ/dot or greater but 1.0 mJ/dot or less and more preferably 0.1 mJ/dot or greater but 0.6 mJ/dot or less in the case of a dot having a diameter of 200 micrometers.

<<Light-Absorbing Material Bearer>>

For example, the shape, structure, size, and material of the light-absorbing material bearer are not particularly limited and may be appropriately selected depending on the intended purpose.

The shape of the light-absorbing material bearer is not particularly limited and may be appropriately selected depending on the intended purpose so long as the light-absorbing material bearer can bear the light-absorbing material on the front surface and allows irradiation with the optical vortex laser beam from the back. Examples of the shape of the light-absorbing material bearer include a flat plate shape, a true-circular or elliptic tubular shape, a surface partially cut out from a tubular shape, and an endless belt type. Among these shapes, a preferable shape of the light-absorbing material bearer is a tubular shape, and it is preferable that there be provided a light-absorbing material supplying section configured to supply the light-absorbing material onto the surface of the light-absorbing material bearer rotating in the circumferential direction. When the light-absorbing material is borne on the surface of the light-absorbing material bearer having a tubular shape, the light-absorbing material can be supplied onto the attachment target irrespective of the dimension of the attachment target in the outer circumferential direction. Further, in this case, the light-absorbing material flying section may be arranged inside the tubular shape, to make it possible for the optical vortex laser beam to be emitted from the inside to the outer circumference, and to enable continuous irradiation by means of rotation of the light-absorbing material bearer in the circumferential direction.

Examples of the light-absorbing material bearer having a flat plate shape include a slide glass.

The structure of the light-absorbing material bearer is not particularly limited and may be appropriately selected depending on the intended purpose.

The size of the light-absorbing material bearer is not particularly limited, may be appropriately selected depending on the intended purpose, and is preferably a dimension corresponding to the width of the attachment target.

The material of the light-absorbing material bearer is not particularly limited and may be appropriately selected depending on the intended purpose so long as the material of the light-absorbing material bearer is transparent to light. In terms of transmittance and heat resistance, preferable examples of the material of the light-absorbing material bearer include inorganic materials such as various kinds of glass mainly formed of silicon oxide and organic materials such as transparent heat-resistant plastic and elastomers.

The transmittance of the light through the light-absorbing material bearer is not particularly limited, may be appropriately selected depending on the intended purpose, and is preferably 75% or higher and more preferably 85% or higher. When the transmittance is in the preferable range, the energy of the optical vortex laser beam absorbed in the light-absorbing material bearer tends not to be converted to heat, to make it rare that the light-absorbing material is caused to undergo changes such as drying and melting. Further, the energy to be applied to the light-absorbing material tends not to be low, providing an advantage that the attachment position does not easily fluctuate.

The transmittance can be measured with, for example, a spectrophotometer (available from JASCO Corporation, V-660DS).

The surface roughness Ra of the light-absorbing material bearer is not particularly limited, may be appropriately selected depending on the intended purpose, and is preferably 1 micrometer or less on both of the front surface and back surface in order to suppress refractive scattering of the optical vortex laser beam and prevent lowering of the energy to be applied to the light-absorbing material. When the surface roughness Ra is in the preferable range, there are advantages that the light-absorbing material attached on the attachment target can be suppressed from being varied in average thickness, and that the light-absorbing material can be attached in a desired amount.

The surface roughness Ra can be measured according to JIS B0601, and can be measured with, for example, a contact probe profilemeter (DEKTAK 150, available from Bruker AXS K.K.).

<Other Sections and Other Steps>

Examples of the other sections include a light-absorbing material supplying section, a beam scanning section, an attachment target conveying section, a fixing section, and a controlling section.

The light-absorbing material flying section, the light-absorbing material bearer, the light-absorbing material supplying section, and the beam scanning section may be handled integrally as a light-absorbing material flying unit.

Examples of the other steps include a light-absorbing material supplying step, a beam scanning step, an attachment target conveying step, a fixing step, and a controlling step.

<<Light-Absorbing Material Supplying Section and Light-Absorbing Material Supplying Step>>

The light-absorbing material supplying section is not particularly limited and may be appropriately selected depending on the intended purpose, so long as the light-absorbing material supplying section can supply the light-absorbing material to the light path of the optical vortex laser beam between the light-absorbing material flying section and the attachment target. For example, the light-absorbing material supplying section may supply the light-absorbing material via a cylindrical light-absorbing material bearer arranged on the light path.

Specifically, in the case of supplying the light-absorbing material onto the light-absorbing material bearer when the light-absorbing material is a liquid, it is possible to provide a supplying roller and a regulating blade as the light-absorbing material supplying section as a very simple configuration for enabling the light-absorbing material to be supplied onto the surface of the light-absorbing material bearer to have a constant average thickness.

In this case, the supplying roller has a surface of the supplying roller partially immersed in a storage tank storing the light-absorbing material, rotates while bearing the light-absorbing material on the surface, and comes to abut on the light-absorbing material bearer to supply the light-absorbing material onto the light-absorbing material bearer. The regulating blade is arranged downstream of the storage tank in the rotation direction of the supplying roller, and is configured to regulate the light-absorbing material borne on the supplying roller to make the average thickness uniform and stabilize the amount of the light-absorbing material to be flown. By making the average thickness very thin, it is possible to suppress the amount of the light-absorbing material to be flown. This makes it possible to attach the light-absorbing material on the attachment target as scattering-suppressed minute dots and to suppress dot gain, which is thickening of the halftone dots. The regulating blade may be arranged downstream of the supplying roller in the rotation direction of the light-absorbing material bearer.

When the light-absorbing material has a high viscosity, it is preferable that the material of the suppling roller have elasticity in at least the surface, in order to ensure contact with the light-absorbing material bearer. When the light-absorbing material has a relatively low viscosity, examples of the supplying roller include a gravure roll, microgravure, and a forward roll as used in precision wet coating.

Furthermore, when not provided with the supplying roller, the light-absorbing material supplying section may bring the light-absorbing material bearer into direct contact with the light-absorbing material in the storage tank, and then scrape off an excessive amount of the light-absorbing material with, for example, a wire bar, to form a layer of the light-absorbing material on the surface of the light-absorbing material bearer. The storage tank may be provided separately from the light-absorbing material supplying section, so the light-absorbing material may be supplied to the light-absorbing material supplying section through, for example, a hose.

The light-absorbing material supplying step is not particularly limited and may be appropriately selected depending on the intended purpose so long as the light-absorbing material supplying step is a step of supplying the light-absorbing material to the light path of the optical vortex laser beam between the light-absorbing material flying section and the attachment target. The light-absorbing material supplying step can be favorably performed by, for example, the light-absorbing material supplying section.

<<Beam Scanning Section and Beam Scanning Step>>

The beam scanning section is not particularly limited and may be appropriately selected depending on the intended purpose so long as the beam scanning section can scan the optical vortex laser beam on the light-absorbing material. For example, the beam scanning section may include a reflecting mirror configured to reflect the optical vortex laser beam emitted by the light-absorbing material flying section toward the light-absorbing material, and a reflecting mirror driving section configured to change the angle and position of the reflecting mirror to scan the optical vortex laser beam on the light-absorbing material.

The beam scanning step is not particularly limited and may be appropriately selected depending on the intended purpose so long as the beam scanning step is a step of scanning the optical vortex laser beam on the light-absorbing material. The beam scanning step can be favorably performed by, for example, the beam scanning section.

<<Attachment Target Conveying Section and Attachment Target Conveying Step>>

The attachment target conveying section is not particularly limited and may be appropriately selected depending on the intended purpose so long as the attachment target conveying section can convey the attachment target. Examples of the attachment target conveying section include a pair of conveying rollers.

The attachment target conveying step is not particularly limited and may be appropriately selected depending on the intended purpose so long as the attachment target conveying step is a step of conveying the attachment target. The attachment target conveying step can be favorably performed by, for example, the attachment target conveying section.

<<Fixing Section and Fixing Step>>

The fixing section is not particularly limited and may be appropriately selected depending on the intended purpose so long as the fixing section can fix the light-absorbing material attached on the attachment target. Examples of the fixing section include a thermocompression bonding system using a heating/pressurizing member.

The heating/pressurizing member is not particularly limited and may be appropriately selected depending on the intended purpose. Examples of the heating/pressurizing member include a heating roller, a pressurizing roller, combination of a heating roller and a pressurizing roller, and the combination additionally including a fixing belt, and these combinations in which the heating roller is changed to a heating block.

In order to suppress image degradation by scratching, it is preferable that the pressurizing roller have a pressurizing surface that moves at the same speed as the attachment target conveyed by the attachment target conveying section. Above all, for the ease of pressurizing the attachment target by contact, it is more preferable that the pressurizing roller have an elastic layer near the surface. Furthermore, in order to suppress image disorders due to attachment of the light-absorbing material on the surface, it is particularly preferable that the pressurizing roller have a water-repelling surface layer formed of a material having a low surface energy such as a silicone-based water-repelling material or a fluorine compound on the outermost surface.

Examples of the water-repelling surface layer formed of the silicone-based water-repelling material include coating films formed of silicone-based release agents, baked coating films formed of silicone oils or various modified silicone oils, coating films formed of silicone varnishes, coating films formed of silicone rubbers, and coating films formed of complexes of the silicone rubbers with, for example, various metals, rubbers, plastic, and ceramic.

Examples of the water-repelling surface layer containing a fluorine compound include coating films formed of fluororesins, coating films formed of organofluorine compounds, baked coating films or adsorption films formed of fluorine oils, coating films formed of fluororubbers, and coating films containing complexes of the fluororubbers with, for example, various metals, rubbers, plastic, and ceramic.

The heating temperature of the heating roller is not particularly limited, may be appropriately selected depending on the intended purpose, and is preferably 80 degrees C. or higher but 200 degrees C. or lower.

The fixing belt is not particularly limited and may be appropriately selected depending on the intended purpose so long as the fixing belt has heat resistance and a high mechanical strength. Examples of the fixing belt include films of, for example, polyimide, polyimide, PET, and PEN. For the fixing belt, it is preferable to use the same material as the material forming the outermost surface of the pressurizing roller, in order to suppress image disorders due to attachment of the light-absorbing material on the surface.

When it is possible to suppress the thickness of the fixing belt, the energy for heating the belt can be saved. This makes it possible to use the fixing belt immediately upon turn on of the power. Here, the temperature and pressure vary depending on the composition of the light-absorbing material to be fixed. However, the temperature is preferably 200 degrees C. or lower in terms of energy saving, and the pressure is preferably 1 kg/cm or lower in terms of stiffness of the apparatus.

When 2 or more kinds of the light-absorbing materials are used, fixing may be performed each time the light-absorbing material of any color is attached on the attachment target, or fixing may be performed after all of the light-absorbing materials are attached on the attachment target and overlaid together.

When the light-absorbing material has a very high viscosity and dries slowly and it is difficult to improve the speed at which the light-absorbing material is attached on the attachment target, the attachment target may be additionally heated to be promoted to dry.

Further, when permeation and wetting of the light-absorbing material into the attachment target are slow, and the light-absorbing material attached is dried in an insufficiently smoothed state, the surface of the attachment target on which the light-absorbing material has been attached becomes rough, and the surface of the attachment target may not be able to obtain glossiness. In order to impart glossiness to the surface of the attachment target, the fixing section that is configured to perform fixing under pressurizing may fix the light-absorbing material attached on the attachment target in a manner to crush the light-absorbing material and press the light-absorbing material into the attachment target, to suppress the surface roughness of the attachment target.

Particularly, when the light-absorbing material that is solid and formed by compacting a powder is used, the fixing section is needed for fixing the solid light-absorbing material on the attachment target. As needed, a known optical fixing device may be used together with the fixing section.

The fixing step is not particularly limited and may be appropriately selected depending on the intended purpose so long as the fixing step is a step of fixing the light-absorbing material attached on the attachment target on the attachment target. For example, the fixing step can be favorably performed by the fixing section.

<<Controlling Section and Controlling Step>>

The controlling section is not particularly limited and may be appropriately selected depending on the intended purpose so long as the controlling section can control the operations of each section. Examples of the controlling section include devices such as a sequencer and a computer.

The controlling step is a step of controlling each of the steps, and can be favorably performed by the controlling section.

<Light-Absorbing Material>

The light-absorbing material contains a light-absorbing substance, and further contains other substances appropriately selected as needed.

—Light-Absorbing Substance—

The light-absorbing substance is not particularly limited and may be appropriately selected depending on the intended purpose so long as the light-absorbing substance absorbs light. Examples of the light-absorbing substance include compounds such as pigments and dyes.

The transmittance of the light through the light-absorbing substance is not particularly limited, may be appropriately selected depending on the intended purpose, and is preferably 70% or lower, more preferably 50% or lower, and particularly preferably 30% or lower. When the transmittance of the light through the light-absorbing substance is in the preferable range, there is an advantage that the light-absorbing substance can be supplied with the energy of the optical vortex laser beam sufficiently.

The transmittance can be measured with, for example, a spectrophotometer (available from JASCO Corporation, V-660DS).

The volume average particle diameter of the light-absorbing substance is not particularly limited, may be appropriately selected depending on the intended purpose, and is preferably 50 nm or greater but 30 micrometers or less. When the volume average particle diameter of the light-absorbing substance is 50 nm or greater, the light-absorbing substance tends not to aggregate and may be easy to disperse in the light-absorbing material uniformly. In the case where the light-absorbing material is a dispersion obtained by dispersing the light-absorbing substance, when the volume average particle diameter of the light-absorbing substance is 30 micrometers or less, it is difficult for the light-absorbing substance to move independently. Therefore, the light-absorbing substance does not separate from other components in the light-absorbing material and is promoted to serve the intended function.

To have succeeded in flying the light-absorbing material containing the dispersoid of 10 micrometers or greater is an advantage that cannot be achieved by an electrophotography system that is constrained by the volume average particle diameter of the dispersoid and an inkjet printing system that is constrained by the nozzle diameter, when this comparison with these systems is made assuming that the light-absorbing material is used instead of a colorant for image formation. This is advantageous in that the latitude of selection of the colorant is remarkably improved.

The volume average particle diameter can be obtained by, for example, a Coulter counter method.

—Other Substances—

The other substances are not particularly limited and may be appropriately selected depending on the intended purpose. Examples of the other substances include a solvent when the light-absorbing material is a liquid such as an ink. Examples of the other substances include a binder resin when the light-absorbing material is a powder such as a toner.

The solvent is not particularly limited and may be appropriately selected depending on the intended purpose. Examples of the solvent include water and organic solvents. In addition, it is possible to impart a function for fixing the light-absorbing material on the attachment target, a function for dispersing the light-absorbing material, a function for adjusting the viscosity of the light-absorbing material, and a function for leveling (uniformly coating) the light-absorbing material in a layer state on the surface of the light-absorbing material bearer.

The binder resin is not particularly limited and may be appropriately selected depending on the intended purpose. It is preferable that a material used in an electrophotographic toner be provided with a function for being fixed on a print medium as the light-absorbing material and a function for forming a layer uniformly on the surface of the light-absorbing material bearer.

For example, the form, size, and constituent material of the light-absorbing material are not particularly limited and may be appropriately selected depending on the intended purpose.

Examples of the form of the light-absorbing material include a liquid, a solid, and a powder. Particularly, to have succeeded in flying a solid and a powder is an advantage that cannot be achieved by existing inkjet printing systems.

Examples of the light-absorbing material that is a liquid include an ink containing a pigment and a solvent. In this case, when the light-absorbing material is irradiated with the optical vortex laser beam, the energy of the optical vortex laser beam is applied to the pigment to fly the pigment together with the solvent.

The viscosity of the light-absorbing material is not particularly limited, may be appropriately selected depending on the intended purpose, and is preferably 1 Pa·s or greater.

The viscosity can be measured with, for example, a rotational viscometer (available from Toki Sangyo Co., Ltd., VISCOMATE VM-150III) in an environment of 25 degrees C.

Examples of the light-absorbing material that is a powder include a toner containing a pigment and a binder resin. In this case, when the light-absorbing material is irradiated with the optical vortex laser beam, the energy of the optical vortex laser beam is applied to the pigment to fly the pigment together with the binder resin as the toner. The light-absorbing material that is a powder may contain only the pigment.

Examples of the light-absorbing material that is a solid include a product obtained by compacting a powder in a dispersed state. The light-absorbing material that is a solid preferably has a layer state having a predetermined average thickness, and the layer-state solid may be borne on the surface of the light-absorbing material bearer.

The size of the light-absorbing material is not particularly limited and may be appropriately selected depending on the intended purpose.

The average thickness of the light-absorbing material is not particularly limited, may be appropriately selected depending on the intended purpose, and is preferably 0.5 micrometers or greater but 500 micrometers or less and more preferably 1 micrometer or greater but 100 micrometers or less. When the average thickness of the light-absorbing material is in the preferable range, there is an advantage that when the light-absorbing material is supplied in a layer state, the strength of the layer can be secured even when the light-absorbing material is continuously flown, to enable stable supplying. Further, the energy of the optical vortex laser beam needs not be too high. Therefore, there is an advantage that the light-absorbing material does not easily degrade or decompose particularly when the light-absorbing material is an organic substance.

Furthermore, by coating the light-absorbing material on the light-absorbing material bearer, it is possible to supply the light-absorbing material stably in the form of a smooth layer maintaining a predetermined thickness even when the average thickness of the light-absorbing material is less than 0.5 micrometers. Depending on the coating method, it is possible to supply the light-absorbing material in the form of a layer maintaining a predetermined pattern.

The method for measuring the average thickness is not particularly limited and may be appropriately selected depending on the intended purpose. Examples of the method include a method of selecting a plurality of arbitrary points of the light-absorbing material and calculating the average of the thicknesses at the plurality of points. The average is preferably an average of thicknesses of 5 points, more preferably an average of thicknesses of 10 points, and particularly preferably an average of thicknesses of 20 points.

The average thickness measuring instrument is not particularly limited and may be appropriately selected depending on the intended purpose. Examples of the measuring instrument include a micrometer.

The constituent material of the light-absorbing material is not particularly limited and may be appropriately selected depending on the intended purpose. For example, when performing image formation, the light-absorbing material may be a colorant such as the toner. When producing a three-dimensional object, the light-absorbing material may be a three-dimensional object forming agent described below.

<Attachment Target>

The attachment target is not particularly limited and may be appropriately selected depending on the intended purpose. Examples of the attachment target include a print medium on which an image is formed, and an object support substrate on which a three-dimensional object is formed.

The gap between the attachment target and the light-absorbing material is not particularly limited and may be appropriately selected depending on the intended purpose so long as the attachment target and the light-absorbing material are kept from contact, and is preferably 0.05 mm or greater but 5 mm or less and more preferably 0.05 mm or greater but 1 mm or less. When the gap is in the preferable range, there is an advantage that the accuracy of the position to which the light-absorbing material is attached on the attachment target tends not to be poor. Further, by keeping the attachment target and the light-absorbing material from contact, it is possible to attach the light-absorbing material on the attachment target irrespective of the compositions of the light-absorbing material and the attachment target.

Moreover, it is preferable that the gap be kept constant by, for example, a position controlling section configured to maintain the attachment target at a constant position. In this case, what matters is to arrange each section, taking into consideration the positional fluctuations of the light-absorbing material and the attachment target and variation in the average thickness.

(Image Forming Apparatus and Method for Forming Image)

An image forming apparatus of the present invention includes at least a colorant flying apparatus and further includes other sections as needed. The colorant flying apparatus is the light-absorbing material flying apparatus in which the light-absorbing material is the colorant. The colorant is flown by the colorant flying section.

A method for forming an image of the present invention includes at least a colorant flying step and further includes other steps as needed. The colorant flying step is the light-absorbing material flying step in which the light-absorbing material is the colorant.

The colorant flying step is the light-absorbing material flying step in which the light-absorbing material is the colorant. The method for forming an image can be favorably performed by the image forming apparatus. The colorant flying step can be favorably performed by the colorant flying section. The other steps can be performed by the other sections.

<Colorant Flying Section and Colorant Flying Step>

The colorant flying section is the same as the light-absorbing material flying section described above except that the light-absorbing material is the colorant and the attachment target is the print medium. Therefore, description about the colorant flying section is skipped.

The colorant flying step is the same as the method for flying a light-absorbing material described above except that the light-absorbing material is the colorant and the attachment target is the print medium. Therefore, description about the colorant flying step is skipped.

<Other Sections and Other Steps>

Examples of the other sections include a colorant supplying section, a beam scanning section, a print medium conveying section, a fixing section, and a controlling section.

The colorant flying section, the colorant supplying section, and the beam scanning section may be handled integrally as a colorant flying unit.

For example, the image forming apparatus may be provided with 4 colorant flying units to fly colorants of yellow, magenta, cyan, and black, which are process colors. The number of colors of the colorants is not particularly limited and may be appropriately selected depending on the intended purpose. The number of the colorant flying units may be increased or decreased as needed. By providing the colorant flying unit including a white colorant upstream of the colorant flying units including the colorants of the process colors in the conveying direction of the print medium, it is possible to provide a white hiding layer. This makes it possible to form an image excellent in color reproducibility on a transparent print medium. However, in the case of, particularly, yellow, white, and transparent colorants, there may be a case when there is a need for changing the laser light source to a laser light source configured to generate, for example, a blue laser beam or an ultraviolet laser beam in order to make the transmittance of light having the wavelength of the optical vortex laser beam through such colorants lower than or equal to 70%.

The image forming apparatus can use colorants that are in a powder form or have a high viscosity. Therefore, even when an image is formed by overlaying the colorants having different colors on the print medium sequentially, it is possible to suppress occurrence of bleeding in which the colorants bleed out and mix with each other. Therefore, a color image having a high image quality can be obtained.

With a view to, for example, downsizing of the image forming apparatus, only 1 colorant flying unit may be provided, and an image with a plurality of colors may be formed by switching the colorants to be supplied to the supplying roller and the colorant bearer.

Examples of the other steps include a colorant supplying step, a beam scanning step, a print medium conveying step, a fixing step, and a controlling step.

<<Colorant Supplying Section and Colorant Supplying Step>>

The colorant supplying section and the colorant supplying step are the same as the light-absorbing material supplying section and the light-absorbing material supplying step described above except that the light-absorbing material is the colorant and the attachment target is the print medium. Therefore, description about the colorant supplying section and the colorant supplying step is skipped.

<<Beam Scanning Section and Beam Scanning Step>>

The beam scanning section and the beam scanning step are the same as the beam scanning section and the beam scanning step described above except that the light-absorbing material is the colorant and the attachment target is the print medium. Therefore, description about the beam scanning section and the beam scanning step is skipped.

<<Print Medium Conveying Section and Print Medium Conveying Step>>

The print medium conveying section and the print medium conveying step are the same as the attachment target conveying section and the attachment target conveying step described above except that the light-absorbing material is the colorant and the attachment target is the print medium. Therefore, description about the print medium conveying section and the print medium conveying step is skipped.

<<Fixing Section and Fixing Step>>

The fixing section and fixing step of the image forming apparatus are the same as the fixing section and fixing step of the light-absorbing material flying apparatus except that the light-absorbing material is the colorant and the attachment target is the print medium. Therefore, description about the fixing section and the fixing step is skipped.

<<Controlling Section and Controlling Step>>

The controlling section and controlling step of the image forming apparatus are the same as the controlling section and controlling step of the light-absorbing material flying apparatus. Therefore, description about the controlling section and the controlling step is skipped.

<Colorant>

Like the light-absorbing material, for example, the shape and material of the colorant are not particularly limited and may be appropriately selected depending on the intended purpose. Differences that accompany when the light-absorbing material is replaced with the colorant will be described below.

The colorant that is in a powder form is not particularly limited and may be appropriately selected depending on the intended purpose. It is preferable that the colorant in a powder form be a powder containing a binder resin, like a toner used in electrophotography systems.

The binder resin is not particularly limited and may be appropriately selected depending on the intended purpose. A binder resin used in an electrophotographic toner is preferable in terms of imparting a fixing function on the print medium and a function for forming a layer uniformly on the surface of the colorant bearer.

The binder resin used in an electrophotographic toner is not particularly limited and may be appropriately selected depending on the intended purpose. Examples of the binder resin include general-purpose resins such as polyester and styrene-based copolymers. Among these binder resins, the polyester is preferable because the polyester has a high affinity with and a good fixability on paper, which is a representative example of the print medium. The polyester is also preferable in terms of having a high compatibility, because the polyester has a molecular structure similar to aliphatic ester compounds used as softening agents.

Examples of monomers that constitute polyester include divalent alcohol components, trivalent or higher polyvalent alcohol components, acid components that form polyester-based polymers, and trivalent or higher polyvalent carboxylic acid components.

Examples of the divalent alcohol components include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, and hydrogenated bisphenol A or diol obtained by polymerizing a cyclic ether such as ethylene oxide or propylene oxide with bisphenol A.

Examples of the trivalent or higher polyvalent alcohol components include sorbitol, 1,2,3,6-hexanetetrol, 1,4-sorbitan, pentaerythritol, dipentaerythritol, tripentaerythritol, 1,2,4-butanetriol, 1,2,5-pentatriol, glycerol, 2-methyl propanetriol, 2-methyl-1,2,4-butanetriol, trimethylolethane, trimethylolpropane, and 1,3,5-trihydroxybenzene.

Examples of the acid components that form polyester-based polymers include benzenedicarboxylic acids or anhydrides of benzenedicarboxylic acids, alkyldicarboxylic acids or anhydrides of alkyldicarboxylic acids, unsaturated dibasic acids, and unsaturated dibasic anhydrides.

Examples of the benzenedicarboxylic acids include phthalic acid, isophthalic acid, and terephthalic acid.

Examples of the alkyldicarboxylic acids include succinic acid, adipic acid, sebacic acid, and azelaic acid.

Examples of the unsaturated dibasic acids include maleic acid, citraconic acid, itaconic acid, alkenylsuccinic acid, fumaric acid, and mesaconic acid.

Examples of the unsaturated dibasic anhydrides include maleic anhydride, citraconic anhydride, itaconic anhydride, and alkenylsuccinic anhydride.

Examples of the trivalent or higher polyvalent carboxylic acid components include trimellitic acid, pyromellitic acid, 1,2,4-benzene tricarboxylic acid, 1,2,5-benzene tricarboxylic acid, 2,5,7-naphthalene tricarboxylic acid, 1,2,4-naphthalene tricarboxylic acid, 1,2,4-butane tricarboxylic acid, 1,2,5-hexane tricarboxylic acid, 1,3-dicarboxy-2-methyl-2-methylenecarboxypropane, tetra(methylenecarboxy)methane, 1,2,7,8-octane tetracarboxylic acid, and empol trimer acid, or anhydrides and partially lower alkyl esters of these trivalent or higher polyvalent carboxylic acid components.

Examples of the styrene-based copolymers include styrene-p-chlorostyrene copolymers, styrene-propylene copolymers, styrene-vinyl toluene copolymers, styrene-vinyl naphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-α-methyl chloromethacrylate copolymers, styrene-acrylonitrile copolymers, styrene-methyl vinyl ketone copolymers, styrene-butadiene copolymers, styrene-isoprene copolymers, styrene-acrylonitrile-indene copolymers, styrene-maleic acid copolymers, and styrene-maleic acid ester copolymers.

Other possible examples include wax components such as hydrocarbon waxes, monoester waxes, carnauba waxes, and polyethylene waxes.

The glass transition temperature of the binder resin is not particularly limited, may be appropriately selected depending on the intended purpose, and is preferably 40 degrees C. or higher but 80 degrees C. or lower and more preferably 50 degrees C. or higher but lower than 70 degrees C.

When the glass transition temperature is in the preferable range, heat-resistant storage stability of the binder resin can be maintained, providing advantages of facilitating formation of a layer on the surface of the colorant bearer and saving an energy for fixing the colorant on the print medium by, for example, heat and pressure.

The colorant that is a liquid is not particularly limited and may be appropriately selected depending on the intended purpose. For example, water-based inks obtained by dispersing, for example, a dye, a pigment, coloring particles, and coloring oil droplets in water serving as a solvent can be used. Not only the water-based inks, but colorants containing liquids having relatively low boiling points such as hydrocarbon-based organic solvents and various alcohols as the solvent can also be used. Among these colorants, the water-based inks are preferable in terms of, for example, safety of volatile components and risk of explosion.

The image forming apparatus can form images also with process inks for offset printing using a plate, JAPAN COLOR-compliant inks, and special color inks. Therefore, the image forming apparatus can easily reproduce digital images adapted to the colors used in offset printing, without using a plate.

Moreover, the image forming apparatus can also form images with UV-curable inks. Therefore, by performing curing in the fixing step by ultraviolet irradiation, it is possible to prevent blocking in which overlaid print media stick to each other and to simplify the drying step.

Examples of constituent materials of the colorant include organic pigments, inorganic pigments and dyes. One of these constituent materials may be used alone or two or more of these constituent materials may be used in combination.

Examples of the organic pigments include dioxazine violet, quinacridone violet, copper phthalocyanine blue, phthalocyanine green, sap green, monoazo yellow, disazo yellow, polyazo yellow, benzimidazolone yellow, isoindolinone yellow, fast yellow, cromophtal yellow, nickel azo yellow, azomethine yellow, benzimidazolone orange, alizarin red, quinacridone red, naphthol red, monoazo red, polyazo red, perylene red, anthraquinonyl red, diketo-pyrrolo-pyrrole red, diketo-pyrrolo-pyrrole orange, benzimidazolone brown, sepia, and aniline black. Examples of metal lake pigments among the organic pigments include Rhodamine lake, quinoline yellow lake, and brilliant blue lake.

Examples of the inorganic pigments include cobalt blue, cerulean blue, cobalt violet, cobalt green, zinc white, titanium white, titanium yellow, chromium titanium yellow, light red, chromium oxide green, Mars black, viridian, yellow ocher, alumina white, cadmium yellow, cadmium red, vermilion, lithopone, ultramarine, talk, white carbon, clay, mineral violet, rose cobalt violet, silver white, calcium carbonate, magnesium carbonate, zinc oxide, zinc sulfide, strontium sulfide, strontium aluminate, yellow copper, gold powder, bronze powder, aluminum powder, brass pigments, ivory black, peach black, lamp black, carbon black, Prussian blue, aureolin, mica titanium, yellow ocher, terre verte, raw sienna, raw umber, tassel earth, chalk, plaster, burnt sienna, burnt umber, lapis lazuli, azulite, malachite, orpiment, cinnabar, coral powder, gofun powder, red iron oxide, ultramarine, deep blue, argentine, and iron oxide-treated pearl.

Among these pigments, carbon black is preferable as the black pigment in terms of hue and an image storage property.

C.I. pigment blue 15:3, which is copper phthalocyanine blue, is preferable as the cyan pigment in terms of hue and an image storage property.

C.I. pigment red 122, which is quinacridone red, C.I. pigment red 269, which is naphthol red, and C.I. pigment red 81:4, which is Rhodamine lake, are preferable as the magenta pigment. One of these magenta pigments may be used alone or two or more of these magenta pigments may be used in combination. Among these magenta pigment, a mixture of C.I. pigment red 122 and C.I. pigment red 269 is more preferable in terms of hue and an image storage property. As the mixture of C.I. pigment red 122 (P.R.122) and C.I. pigment red 269 (P.R.269), a mixture with a P.R.122:P.R.269 ratio of 5:95 or greater but 80:20 or less is particularly preferable. When the P.R.122:P.R.269 ratio is in the particularly preferable range, the hue falls within the magenta color.

C.I. pigment yellow 74, which is monoazo yellow, C.I. pigment yellow 155, which is disazo yellow, C.I. pigment yellow 180, which is benzimidazolone yellow, and C.I. pigment yellow 185, which is isoindolinone yellow, are preferable as the yellow pigment. Among these yellow pigments, C.I. pigment yellow 185 is more preferable in terms of hue and an image storage property. One of these yellow pigments may be used alone or two or more of these yellow pigments may be used in combination.

When using the light-absorbing material as a process color toner serving as the colorant, it is preferable to use the light-absorbing material in a toner set including the 4 colors.

Many of the inorganic pigments are formed of particles having a volume average particle diameter of greater than 10 micrometers. When using the inorganic pigment having a volume average particle diameter of 10 micrometers or greater as the colorant, it is preferable that the colorant be a liquid. The colorant that is a liquid is advantageous in that a force other than non-electrostatic adhesive forces, such as an electrostatic force, is not needed to maintain the colorant in a stable state. In this regard, the method for forming an image of the present invention is very effective, compared with the inkjet printing systems that have an obvious tendency towards nozzle clogging and ink sedimentation and cannot expect a stable continuous printing process. The method for forming an image of the present invention is also very effective, compared with the electrophotography systems that cannot establish a stable continuous printing process if the colorant particles have a small surface area that cannot afford a sufficient charge capacity.

Examples of the dyes include monoazo dyes, polyazo dyes, metal complexed azo-dyes, pyrazolone azo-dyes, stilbene azo-dyes, thiazole azo-dyes, anthraquinone derivatives, anthrone derivatives, indigo derivatives, thioindigo derivatives, phthalocyanine dyes, diphenyl methane dyes, triphenylmethane dyes, xanthene dyes, acridine dyes, azine dyes, oxazine dyes, thiazine dyes, polymethine dyes, azomethine dyes, quinoline dyes, nitro dyes, nitroso dyes, benzoquinone dyes, naphthoquinone dyes, naphthalimide dyes, and perinone dyes.

<<Viscosity of Colorant>>

The viscosity of the colorant is not particularly limited and may be appropriately selected depending on the intended purpose.

When a colorant that is a liquid and permeates the print medium is used, the colorant attached on the print medium may cause feathering or bleeding. However, with the colorant that has a high viscosity, is handleable by the image forming apparatus of the present invention, dries faster than the speed of permeation into the print medium, and can suppress bleeding in particular, it is possible to improve chromogenicity, make edges sharp, and form images having high image qualities. Further, when performing overprinting of attaching the colorant in an overlaid state for gray level expression, it is possible to suppress bleeding due to increase in the amount of the colorant.

Furthermore, the method for forming an image is intended to attach the liquid colorant by flying. Therefore, the method for forming an image can perform printing favorably even when the print medium has a minute roughness, compared with a so-called thermal transfer system that is configured to melt a colorant by heat and transfer the colorant from a film-like colorant bearer.

<<Average Thickness of Colorant>>

The average thickness of the colorant is not particularly limited, may be appropriately selected depending on the intended purpose, and is preferably 100 micrometers or less. When the average thickness of the colorant is 100 micrometers or less, it is possible to save the energy for flying the colorant. This is advantageous in durability of the colorant bearer, and in that the composition of the colorant when the colorant is an organic substance is less likely to undergo, for example, decomposition. The preferable range of the average thickness varies depending on the print medium and the intended purpose.

For example, when coat paper or a smooth film used in typical offset printing is used as the print medium, the average thickness of the colorant is preferably 0.5 micrometers or greater but 5 micrometers or less. When the average thickness is in the preferable range, it is difficult for a human eye to recognize a color difference due to a minor variation in the average thickness of the print medium. This is advantageous in that an image tends to have a high saturation even on the coat paper, and in that an image expressed tends to be clear without obvious dot gain of the halftone dots.

Further, for example, when a print medium having a surface roughness greater than the surface roughness of coat paper or film, such as pure paper used in offices is used, the average thickness of the colorant is preferably 3 micrometers or greater but 10 micrometers or less. When the average thickness is in the preferable range, a good image quality tends to be obtained without influence from the surface roughness of the print medium. Furthermore, particularly, when a full-color image is expressed with the colorants of the process colors, an obvious stepped difference tends not to be felt even though layers of the plurality of colorants are overlaid.

When the colorant is used in textile printing in which, for example, cloth or fiber is stained, the colorant often needs to have an average thickness of 5 micrometers or greater in order to be attached on cotton, silk, or synthetic fiber serving as the print medium. This is because the diameter of the fiber is greater than in paper. Therefore, in many cases, the colorant is needed in a large amount.

<Colorant Bearer>

The colorant bearer is the same as the light-absorbing material bearer of the light-absorbing material flying apparatus described above except that the light-absorbing material is the colorant. Therefore, description about the colorant bearer is skipped.

<Print Medium>

The print medium is not particularly limited and may be appropriately selected depending on the intended purpose. Examples of the print medium include coat paper, pure paper, film, cloth, and fiber.

The gap between the print medium and the colorant bearer is the same as described about the gap between the light-absorbing material and the light-absorbing material bearer in the light-absorbing material flying apparatus described above except that the light-absorbing material is the colorant and the attachment target is the print medium. Therefore, description about the gap between the print medium and the colorant bearer is skipped.

(Three-Dimensional Object Producing Apparatus and Method for Producing Three-Dimensional Object)

A three-dimensional object producing apparatus of the present invention includes at least a three-dimensional object forming agent flying apparatus, and further includes other sections as needed. The three-dimensional object forming agent flying apparatus is the light-absorbing material flying apparatus in which the light-absorbing material is the three-dimensional object forming agent. The three-dimensional object forming agent is flown by the three-dimensional object forming agent flying section.

A method for producing a three-dimensional object of the present invention includes at least a three-dimensional object forming agent flying step, and further includes other steps as needed. The three-dimensional object forming agent flying step is the light-absorbing material flying step in which the light-absorbing material is the three-dimensional object forming agent.

The method for producing a three-dimensional object can be favorably performed by the three-dimensional object producing apparatus. The three-dimensional object forming agent flying step can be favorably performed by the three-dimensional object forming agent flying section. The other steps can be performed by the other sections.

<Three-Dimensional Object Forming Agent Flying Section and Three-Dimensional Object Forming Agent Flying Step>

The three-dimensional object forming agent flying section is the same as the light-absorbing material flying section described above except that the light-absorbing material is the three-dimensional object forming agent and the attachment target is the object support substrate. Therefore, description about the three-dimensional object forming agent flying section is skipped. The three-dimensional object forming agent flying section is configured to laminate the three-dimensional object forming agent on the object support substrate in the form of layers and attach the three-dimensional object forming agent three-dimensionally.

The three-dimensional object forming agent flying step is the same as the light-absorbing material flying step described above except that the light-absorbing material is the three-dimensional object forming agent and the attachment target is the object support substrate. Therefore, description about the three-dimensional object forming agent flying step is skipped. The three-dimensional object forming agent flying step includes a step in which the three-dimensional object forming agent flying section three-dimensionally attaches the three-dimensional object forming agent on the object support substrate.

<Three-Dimensional Object Forming Agent Curing Section and Three-Dimensional Object Forming Agent Curing Step>

The three-dimensional object forming agent curing section is not particularly limited and may be appropriately selected depending on the intended purpose. Examples of the three-dimensional object forming agent curing section include an ultraviolet irradiator when the three-dimensional object forming agent is an ultraviolet-ray-curable material.

The three-dimensional object forming agent curing step is not particularly limited and may be appropriately selected depending on the intended purpose. Examples of the three-dimensional object forming agent curing step include an ultraviolet ray irradiating step when the three-dimensional object forming agent is an ultraviolet-ray-curable material. The three-dimensional object forming agent curing step can be favorably performed by the three-dimensional object forming agent curing section.

<Other Steps and Other Sections>

Examples of the other sections include a three-dimensional object forming agent supplying section, a three-dimensional object forming head unit scanning section, a substrate position adjusting section, and a controlling section.

Examples of the other steps include a three-dimensional object forming agent supplying step, a three-dimensional object forming head unit scanning step, a substrate position adjusting step, and a controlling step.

<<Three-Dimensional Object Forming Agent Supplying Section and Three-Dimensional Object Forming Agent Supplying Step>>

The three-dimensional object forming agent supplying section and the three-dimensional object forming agent supplying step are the same as the light-absorbing material supplying section and the light-absorbing material supplying step described above except that the light-absorbing material is the three-dimensional object forming agent and the attachment target is the object support substrate. Therefore, description about the three-dimensional object forming agent supplying section and the three-dimensional object forming agent supplying step is skipped.

<<Three-Dimensional Object Forming Head Unit Scanning Section and Three-Dimensional Object Forming Head Unit Scanning Step>>

The three-dimensional object forming head unit scanning section is not particularly limited and may be appropriately selected depending on the intended purpose. For example, a three-dimensional object forming head unit in which the three-dimensional object forming agent flying section and an ultraviolet ray irradiating section are integrated may be scanned on the object support substrate in the direction of the width of the apparatus (X axis). The three-dimensional object forming head unit is configured to cure the three-dimensional object forming agent that is ultraviolet-ray-curable and attached by the three-dimensional object forming agent flying section by the ultraviolet ray irradiating section. It is possible to provide a plurality of three-dimensional object forming head units.

The three-dimensional object forming head unit scanning step is not particularly limited and may be appropriately selected depending on the intended purpose so long as the three-dimensional object forming head unit scanning step is a step of scanning the three-dimensional object forming head unit. For example, the three-dimensional object forming head unit scanning step can be favorably performed by the three-dimensional object forming head unit scanning section.

<<Substrate Position Adjusting Section and Substrate Position Adjusting Step>>

The substrate position adjusting section is not particularly limited and may be appropriately selected depending on the intended purpose. Examples of the substrate position adjusting section include a base (stage) that can adjust the positions of the object support substrate in the direction of the depth of the apparatus (Y axis) and in the direction of the height of the apparatus (Z axis).

The substrate position adjusting step is not particularly limited and may be appropriately selected depending on the intended purpose so long as the substrate position adjusting step is a step of adjusting the position of the object support substrate. For example, the substrate position adjusting step can be favorably performed by the substrate position adjusting section.

<<Controlling Section and Controlling Step>>

The controlling section and the controlling step are the same as the controlling section and the controlling step of the light-absorbing material flying apparatus described above. Therefore, description about the controlling section and the controlling step is skipped.

<Three-Dimensional Object Forming Agent>

Like the light-absorbing material, for example, the shape and material of the three-dimensional object forming agent are not particularly limited and may be appropriately selected depending on the intended purpose. Differences that accompany when the light-absorbing material is replaced with the three-dimensional object forming agent will be described below.

The average thickness of the three-dimensional object forming agent is not particularly limited, may be appropriately selected depending on the intended purpose, and is preferably 5 micrometers or greater but 500 micrometers or less although depending on the precision desired. The average thickness in the preferable range is advantageous in terms of the precision, texture, smoothness, and production time of the three-dimensional object. The average thickness of the three-dimensional object forming agent is more preferably 5 micrometers or greater but 100 micrometers or less. The average thickness in the more preferable range is advantageous in that the energy of the optical vortex laser beam can be suppressed to a low level, leading to suppression of degradation of the three-dimensional object forming agent.

The three-dimensional object forming agent contains a curable material and further contains other components as needed.

<<Curable Material>>

The curable material is not particularly limited and may be appropriately selected depending on the intended purpose, so long as the curable material is a compound that develops a polymerization reaction and cures in response to, for example, irradiation of an active energy ray (e.g., an ultraviolet ray and an electron beam) or heating. Examples of the curable material include active-energy-ray-curable compounds and thermosetting compounds. Among these curable materials, materials that are liquid at normal temperature are preferable.

The active-energy-ray-curable compounds are monomers having a relatively low viscosity and containing a radical-polymerizable unsaturated double bond in the molecular structure. Examples of the active-energy-ray-curable compounds include monofunctional monomers and multifunctional monomers.

<<Other Components>>

The other components are not particularly limited and may be appropriately selected depending on the intended purpose. Examples of the other components include water, an organic solvent, a photopolymerization initiator, a surfactant, a colorant, a stabilizing agent, a water-soluble resin, a low-boiling-point alcohol, a surface treating agent, a viscosity modifier, a tackifier, an antioxidant, an age resister, a cross-linking accelerator, an ultraviolet absorber, a plasticizer, an antiseptic, and a dispersant.

<Three-Dimensional Object Forming Agent Bearer>

The three-dimensional object forming agent bearer is the same as the light-absorbing material bearer described above except that the light-absorbing material is the three-dimensional object forming agent. Therefore, description about the three-dimensional object forming agent bearer is skipped.

<Object Support Substrate>

The object support substrate is not particularly limited and may be appropriately selected depending on the intended purpose. For example, the positions of the object support substrate on the Y axis and the Z axis may be adjusted by the substrate position adjusting section.

The gap between the object support substrate and the three-dimensional object forming agent bearer is the same as the gap between the attachment target and the light-absorbing material bearer. Therefore, description about the gap between the object support substrate and the three-dimensional object forming agent bearer is skipped.

Next, an example of the image forming apparatus of the present invention will be described with reference to the drawings.

For example, the number, position, and shape of the constituent members described below are not limited to the present embodiment, but may be changed to the number, position, and shape that are preferable for working the present invention.

Figure 4A:
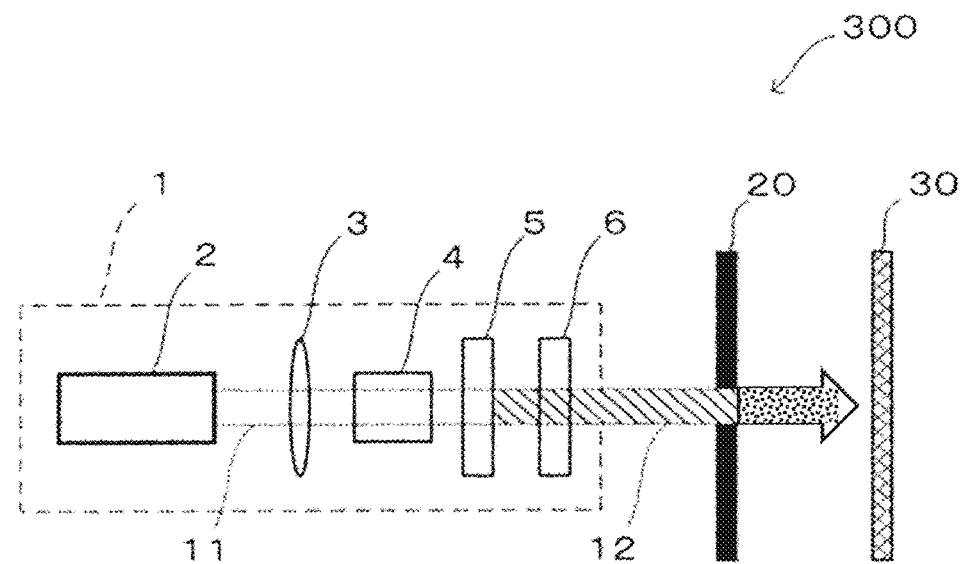
FIG. 4A is a schematic cross-sectional view illustrating an example of a light-absorbing material flying apparatus of the present invention.

FIG. 4A is a view illustrating an example of the light-absorbing material flying apparatus of the present invention.

In FIG. 4A, a light-absorbing material flying apparatus 300 is an apparatus that includes a light-absorbing material flying section 1, a light-absorbing material 20, and an attachment target 30, and causes the light-absorbing material flying section 1 to irradiate the light-absorbing material 20 that absorbs light with an optical vortex laser beam 12 corresponding to the light absorption wavelength of the light-absorbing material, to fly the light-absorbing material 20 by the energy of the optical vortex laser beam 12 in the direction in which the optical vortex laser beam is emitted to attach the light-absorbing material on the attachment target 30.

The light-absorbing material flying section 1 includes a laser light source 2, a beam diameter changing section 3, a beam wavelength changing section 4, an optical vortex converting section 5, and an energy adjusting filter 6.

The laser light source 2 is, for example, a titanium-sapphire laser, and is configured to generate a pulse oscillated laser beam 11 and irradiate the beam diameter changing section 3 with the laser beam 11.

The beam diameter changing section 3 is, for example, a condenser lens, is arranged downstream of the laser light source 2 on the light path of the laser beam 11 generated by the laser light source 2, and is configured to change the diameter of the laser beam 11.

The beam wavelength changing section 4 is, for example, a KTP crystal, is arranged downstream of the beam diameter changing section 3 on the light path of the laser beam 11, and is configured to change the wavelength of the laser beam 11 to a wavelength that can be absorbed by the light-absorbing material 20.

The optical vortex converting section 5 is, for example, a spiral phase plate, is arranged downstream of the beam wavelength changing section 4 on the light path of the laser beam 11, and is configured to convert the laser beam 11 to the optical vortex laser beam 12.

The energy adjusting filter 6 is formed of, for example, glass through which the transmittance of the optical vortex laser beam 12 is low, is arranged downstream of the optical vortex converting section 5 on the light path of the optical vortex laser beam 12, and is configured to change the energy of the optical vortex laser beam 12 that has passed through the energy adjusting filter to an adequate energy for flying the light-absorbing material 20.

The light-absorbing material 20 is irradiated with the optical vortex laser beam 12 that has passed through the energy adjusting filter 6, flies upon application of the energy within the range of the diameter of the optical vortex laser beam 12, and attaches on the attachment target 30. The flown light-absorbing material 20 attaches on the attachment target 30 while being suppressed from scattering around by a gyro effect imparted by the optical vortex laser beam 12.

Here, the flying amount of the light-absorbing material 20 to fly corresponds to a part or the whole of the area of the light-absorbing material 20 irradiated with the optical vortex laser beam 12, and can be adjusted by, for example, the energy adjusting filter 6.

Figure 4B:
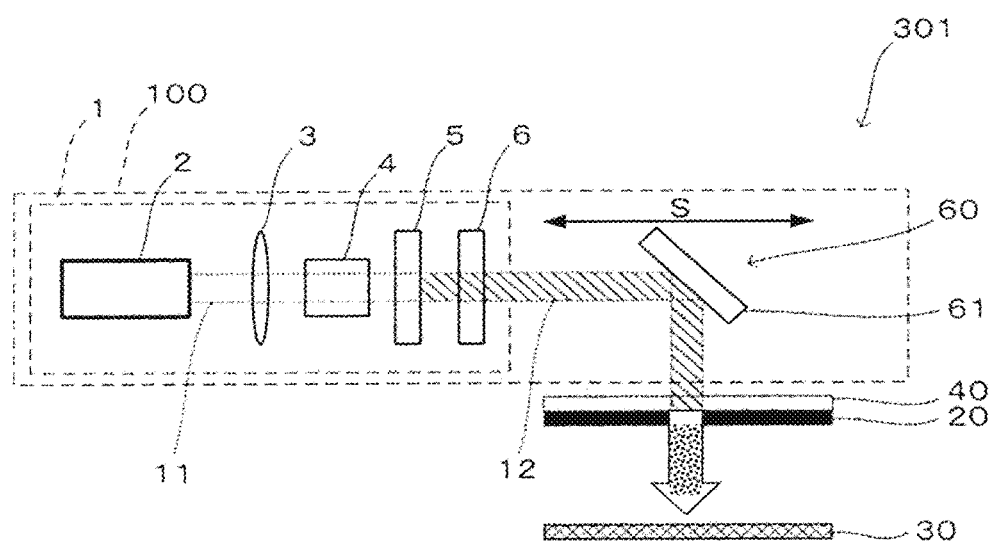
FIG. 4B is a schematic cross-sectional view illustrating another example of a light-absorbing material flying apparatus of the present invention.

FIG. 4B is a view illustrating another example of the light-absorbing material flying apparatus of the present invention.

In FIG. 4B, a light-absorbing material flying apparatus 301 includes a light-absorbing material bearer 40 and a beam scanning section 60 in addition to the sections of the light-absorbing material flying apparatus 300 illustrated in FIG. 4A. The light-absorbing material flying apparatus 301 can cause the beam scanning section 60 to scan an optical vortex laser beam 12 generated by the light-absorbing material flying section 1 in a direction orthogonal to the direction in which the optical vortex laser beam 12 is emitted, to irradiate an arbitrary position of the light-absorbing material 20 borne on the flat-plate-shaped light-absorbing material bearer 40 with the optical vortex laser beam to fly the light-absorbing material 20 and attach the flown light-absorbing material 20 on the attachment target 30.

The beam scanning section 60 is arranged downstream of the light-absorbing material flying section 1 on the light path of the optical vortex laser beam 12, and includes a reflecting mirror 61.

The reflecting mirror 61 is movable by an unillustrated reflecting mirror driving section in the scanning direction indicated by an arrow S in FIG. 4B, and is configured to reflect the optical vortex laser beam 12 to an arbitrary position of the light-absorbing material 20.

The beam scanning section 60 may be configured to scan the optical vortex laser beam 12 to an arbitrary position, by, for example, moving the light-absorbing material flying section 1, or pivoting the light-absorbing material flying section 1 to change the direction in which the optical vortex laser beam 12 is emitted, or using a polygon mirror as the reflecting mirror 61.

The light-absorbing material bearer 40 is arranged downstream of the beam scanning section 60 on the light path of the optical vortex laser beam 12, and is used for immobilizing the light-absorbing material 20 coated on the light-absorbing material bearer, when the light-absorbing material 20 is a liquid having a high viscosity. The light-absorbing material bearer 40 is transparent to light, and is configured to bear the light-absorbing material 20 on the surface in order for the light-absorbing material 20 to be irradiated with the optical vortex laser beam 12 from the back surface.

By controlling a layer, which is to be formed of the light-absorbing material 20, to have a constant average thickness at the stage of bearing the light-absorbing material 20 on the light-absorbing material bearer 40, it is possible to stabilize the amount of the light-absorbing material 20 to be flown.

A combination of the light-absorbing material flying section 1 and the beam scanning section 60 is referred to as optical vortex laser beam irradiating unit 100.

Figure 5A:
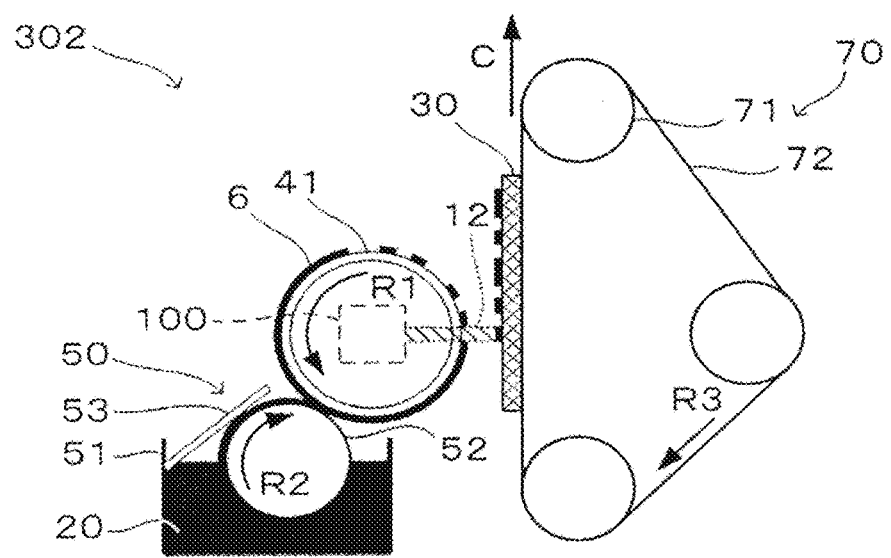
FIG. 5A is a schematic cross-sectional view illustrating an example of the light-absorbing material flying apparatus that is illustrated in FIG. 4B and to which a light-absorbing material supplying section and an attachment target conveying section are added.

FIG. 5A is a view illustrating an example of the light-absorbing material flying apparatus that is illustrated in FIG. 4B and to which a light-absorbing material supplying section and an attachment target conveying section are added.

In FIG. 5A, a light-absorbing material flying apparatus 302 is an apparatus that includes a light-absorbing material supplying section 50 and an attachment target conveying section 70 in addition to the sections of the light-absorbing material flying apparatus 301 illustrated in FIG. 4B, and includes a cylindrical light-absorbing material bearing roller 41 instead of the flat-plate-shaped light-absorbing material bearer 40. An optical vortex laser beam irradiating unit 100 is arranged inside the light-absorbing material bearing roller 41, and is configured to irradiate the attachment target 30 borne on the outer circumference of the light-absorbing material bearing roller 41 with the optical vortex laser beam 12.

The light-absorbing material supplying section 50 includes a storage tank 51, a supplying roller 52, and a regulating blade 53.

The storage tank 51 is arranged in the lower adjacency of the supplying roller 52, and is configured to store the light-absorbing material 20.

The supplying roller 52 is arranged to abut on the light-absorbing material bearing roller 41, is partially immersed in the light-absorbing material 20 in the storage tank 51, and is configured to rotate in the rotation direction indicated by an arrow R2 in FIG. 5A by means of an unillustrated rotation driving section or by following the rotation of the light-absorbing material bearing roller 41 to have the light-absorbing material 20 attached on the surface. The attached light-absorbing material 20 is regulated to a uniform average thickness by the regulating blade 53 and transferred onto the light-absorbing material bearing roller 41 to be supplied in the form of a layer. The light-absorbing material 20 supplied onto the surface of the light-absorbing material bearing roller 41 is continuously supplied to the position that is irradiated with the optical vortex laser beam 12 by the rotation of the light-absorbing material bearing roller 41.

The regulating blade 53 is arranged upstream of the light-absorbing material bearing roller 41 in the rotation direction indicated by the arrow R2 in the drawing, and is configured to regulate the light-absorbing material 20 which the supplying roller 52 has attached on the surface to make the average thickness of the light-absorbing material 20 to be supplied onto the light-absorbing material bearing roller 41 uniform.

The attachment target conveying section 70 is arranged near the light-absorbing material bearing roller 41 in a manner that the light-absorbing material bearing roller 41 and the attachment target 30 conveyed do not contact each other, and includes an attachment target conveying roller 71 and an attachment target conveying belt 72 stretched on the attachment target conveying roller 71. The attachment target conveying section 70 is configured to rotate the attachment target conveying roller 71 by means of an unillustrated rotation driving section to convey the attachment target 30 on the attachment target conveying belt 72 in the conveying direction indicated by an arrow C in FIG. 5A.

The optical vortex laser beam irradiating unit 100 is configured to emit the optical vortex laser beam 12 from inside the light-absorbing material bearing roller 41 based on image information to attach the light-absorbing material 20 on the attachment target 30. It is possible to form a two-dimensional image on the attachment target 30, by performing this attaching operation of attaching the light-absorbing material 20 on the attachment target 30 while moving the attachment target 30 by means of the attachment target conveying belt 72.

The light-absorbing material 20 that has been borne on the surface of the light-absorbing material bearing roller 4 but has not been flown accumulates by the rotational abutting of the light-absorbing material bearing roller 41 on the supplying roller 52 and eventually falls into the storage tank 51 to be collected. The method for collecting the light-absorbing material 20 is not limited to the above, and, for example, a scraper configured to scrape off the light-absorbing material 20 on the surface of the light-absorbing material bearing roller 41 may be provided.

Figure 5B:
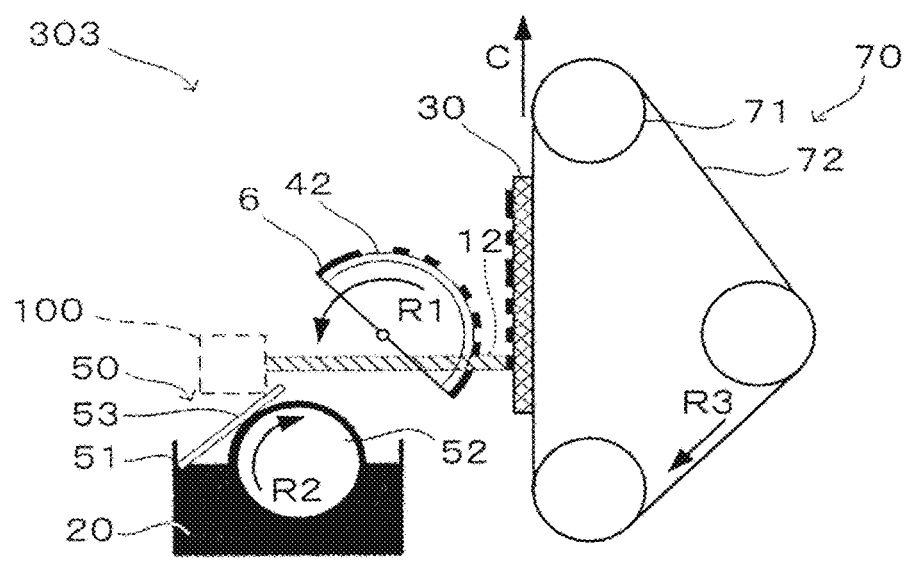
FIG. 5B is a schematic cross-sectional view illustrating another example of the light-absorbing material flying apparatus that is illustrated in FIG. 4B and to which a light-absorbing material supplying section and an attachment target conveying section are added.

FIG. 5B is a view illustrating another example of the light-absorbing material flying apparatus that is illustrated in FIG. 4B and to which a light-absorbing material supplying section and an attachment target conveying section are added.

In FIG. 5B, a light-absorbing material flying apparatus 303 is obtained by modifying the arrangement of the light-absorbing material flying apparatus 302 illustrated in FIG. 5A, by dividing the cylindrical light-absorbing material bearing roller 41 of the light-absorbing material flying apparatus 302 along the axial direction into 2 parts as a light-absorbing material bearing section 42.

The light-absorbing material bearing section 42 has a shape that is defined by a partial surface of a cylindrical shape and has no surface on the opposite side with respect to the center line of the cylinder. Such a bearing section having no opposite surface can simplify the apparatus because the optical vortex laser beam irradiating unit 100 is not provided inside the cylindrical light-absorbing material bearing roller 41, to make it easier to secure the light path of the optical vortex laser beam 12.

Figure 5C:
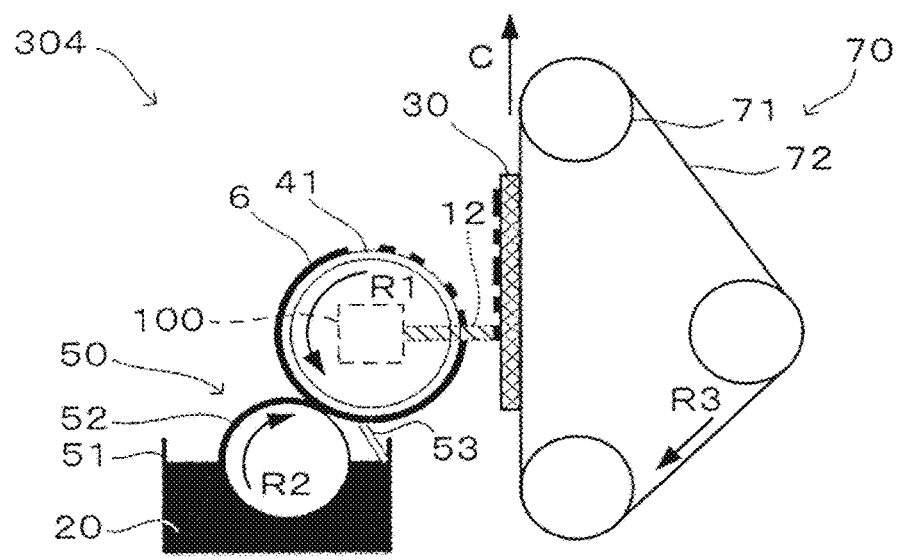
FIG. 5C is a schematic cross-sectional view illustrating another example of the light-absorbing material flying apparatus that is illustrated in FIG. 4B and to which a light-absorbing material supplying section and an attachment target conveying section are added.

FIG. 5C is a view illustrating another example of the light-absorbing material flying apparatus that is illustrated in FIG. 4B and to which a light-absorbing material supplying section and an attachment target conveying section are added.

In FIG. 5C, a light-absorbing material flying apparatus 304 is obtained by changing the position of the regulating blade 53 in the light-absorbing material flying apparatus 302 illustrated in FIG. 5A. The light-absorbing material flying apparatus 304 is preferable for use, particularly when the light-absorbing material 20 is a powder.

The regulating blade 53 arranged near the light-absorbing material bearing roller 41 is configured to regulate the bearing amount of the light-absorbing material 20 supplied by the light-absorbing material supplying section 50 onto the light-absorbing material bearing roller 41. This arrangement of the regulating blade 53 is the same as the arrangement of a regulating blade in a section configured to supply a toner onto a developing roller in a typical electrophotographic one-component developing device.

When the light-absorbing material 20 is a powder as in this case, the light-absorbing material 20 attached on the surface of the attachment target 30 may be fixed on the attachment target 30 by a treatment such as pressurizing or heating.

Figure 6A:
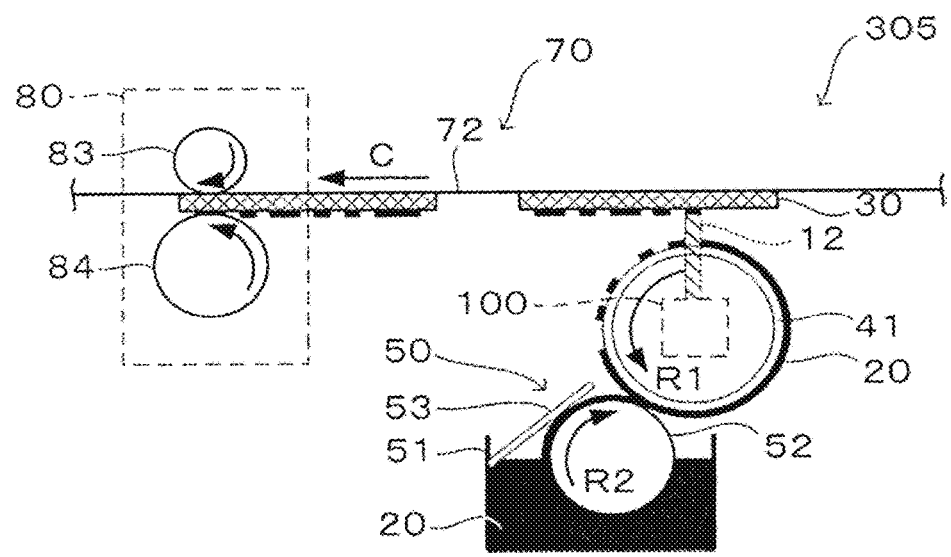
FIG. 6A is a schematic cross-sectional view illustrating an example of the light-absorbing material flying apparatus that is illustrated in FIG. 5A and to which a fixing section is added.

FIG. 6A is a view illustrating an example of the light-absorbing material flying apparatus that is illustrated in FIG. 5A and to which a fixing section is added.

In FIG. 6A, a light-absorbing material flying apparatus 305 includes a fixing section 80 in addition to the sections of the light-absorbing material flying apparatus illustrated in FIG. 5A, in order to fix and smooth the light-absorbing material 20 attached on the attachment target 30. In FIG. 5A, the position of the attachment target conveying section 70 is on the side of the light-absorbing material bearing roller 41, whereas in FIG. 6A, the position of the attachment target conveying section 70 is above the light-absorbing material bearing roller 41 for the expediency of description.

The fixing section 80 is a pressurizing-type fixing section, is arranged downstream of the light-absorbing material bearing roller 41 in the conveying direction of the attachment target 30 indicated by an arrow C in FIG. 6A, and includes a pressurizing roller 83 and a facing roller 84. The fixing section 80 is configured to fix the light-absorbing material 20 on the attachment target 30 by nipping and conveying the attachment target 30 on which the light-absorbing material 20 is attached.

The pressurizing roller 83 is biased toward the facing roller 84, has the surface of the pressurizing roller contact the attachment target 30, and is configured to pressurize the attachment target 30 while nipping the attachment target 30 with the facing roller 84.

The facing roller 84 is arranged at a position abutting on the pressurizing roller 83, and is configured to nip the attachment target 30 with the pressurizing roller 83 via the attachment target conveying belt 72.

For example, when the light-absorbing material flying apparatus 305 is used as an image forming apparatus, there is a case when the light-absorbing material 20 is slow in permeation or wetting into the attachment target 30 if the light-absorbing material 20 used has a very high viscosity of 1,000 mPa·s or greater, to make the surface roughness of the image high if the light-absorbing material 20 dries in that poorly permeated or wetted state, resulting in a poor glossiness of the image. In this case, if the fixing section 80 is provided, the pressurizing roller 83 can pressurize the attachment target 30 on which the light-absorbing material 20 is attached, to enable the light-absorbing material 20 to be pressed into the attachment target 30 or to be crushed. As a result, the surface roughness of the attachment target 30 on which the light-absorbing material 20 is attached can be suppressed.

Figure 6B:
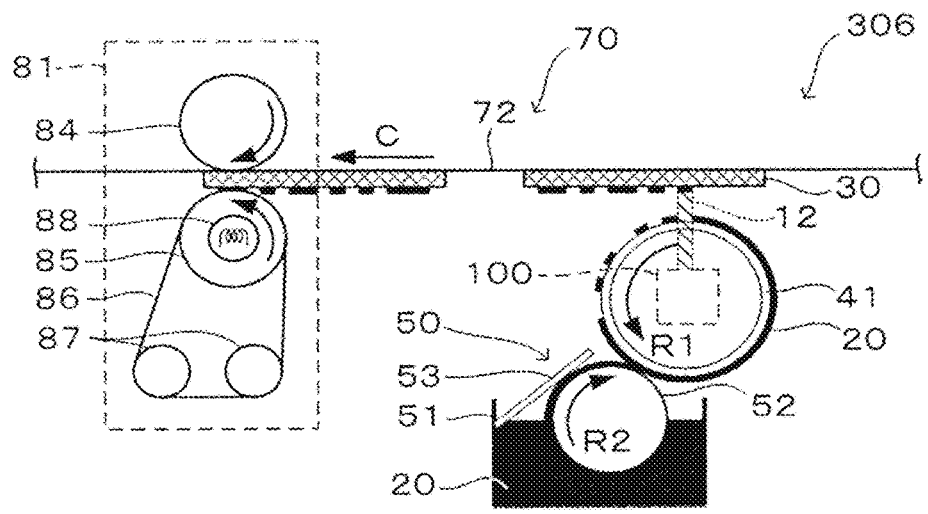
FIG. 6B is a schematic cross-sectional view illustrating another example of the light-absorbing material flying apparatus that is illustrated in FIG. 5A and to which a fixing section is added.

FIG. 6B is a view illustrating another example of the light-absorbing material flying apparatus that is illustrated in FIG. 5A and to which a fixing section is added.

In FIG. 6B, a light-absorbing material flying apparatus 306 is obtained by changing the pressurizing-type fixing section 80 of the light-absorbing material flying apparatus 305 illustrated in FIG. 6A to a heating/pressurizing-type fixing section 81.

The fixing section 81 is arranged downstream of a light-absorbing material bearing roller 41 in the conveying direction of the attachment target 30 indicated by an arrow C in FIG. 6B, and includes a heating/pressurizing roller 85, a fixing belt 86, driven rollers 87, a halogen lamp 88, and a facing roller 84. The fixing section 81 is configured to fix the light-absorbing material 20 on the attachment target 30 by heating and pressurizing the attachment target 30 on which the light-absorbing material 20 is attached while nipping the attachment target 30. Therefore, the fixing section 81 is used when an intended image cannot be obtained only by pressurizing, when the light-absorbing material 20 used is a powder such as an electrophotographic toner or a powder paint, or when the light-absorbing material 20 used is a dispersion liquid obtained by dispersing a material that needs melting.

The heating/pressurizing roller 85 is biased toward the facing roller 84 and is configured to heat and pressurize the attachment target 30 while nipping the attachment target 30 with the facing roller 84 via the fixing belt 86.

The fixing belt 86 is an endless belt type, and is stretched on the heating/pressurizing roller 85 and the driven rollers 87. The surface of the fixing belt contacts the attachment target 30.

The driven rollers 87 are arranged below the heating/pressurizing roller 85 and are driven to follow the rotation of the heating/pressurizing roller 85.

The halogen lamp 88 is arranged inside the heating/pressurizing roller 85 and is configured to generate heat for fixing the light-absorbing material 20 on the attachment target 30.

The facing roller 84 is arranged at a position abutting the fixing belt 86, and is configured to nip the attachment target 30 with the heating/pressurizing roller 85 via the attachment target conveying belt 72.

Figure 6C:
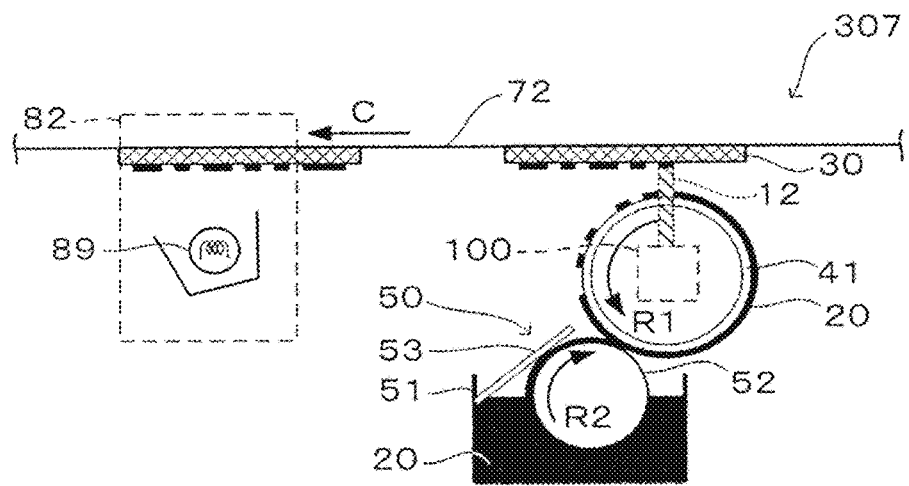
FIG. 6C is a schematic cross-sectional view illustrating another example of the light-absorbing material flying apparatus that is illustrated in FIG. 5A and to which a fixing section is added.

FIG. 6C is a view illustrating another example of the light-absorbing material flying apparatus that is illustrated in FIG. 5A and to which a fixing section is added.

In FIG. 6C, a light-absorbing material flying apparatus 307 is obtained by changing the pressurizing-type fixing section 80 of the light-absorbing material flying apparatus 305 illustrated in FIG. 6A to a UV-irradiating-type fixing section 82.

The fixing section 82 is arranged downstream of the light-absorbing material bearing roller 41 in the conveying direction of the attachment target 30 indicated by an arrow C in FIG. 6C, and includes a UV lamp 89. The fixing section 81 is used when an ultraviolet-ray-curable material is used as the light-absorbing material 20, and is configured to irradiate the light-absorbing material 20 with UV by the UV lamp 89 to fix the light-absorbing material 20 on the attachment target 30.

Figure 7A:
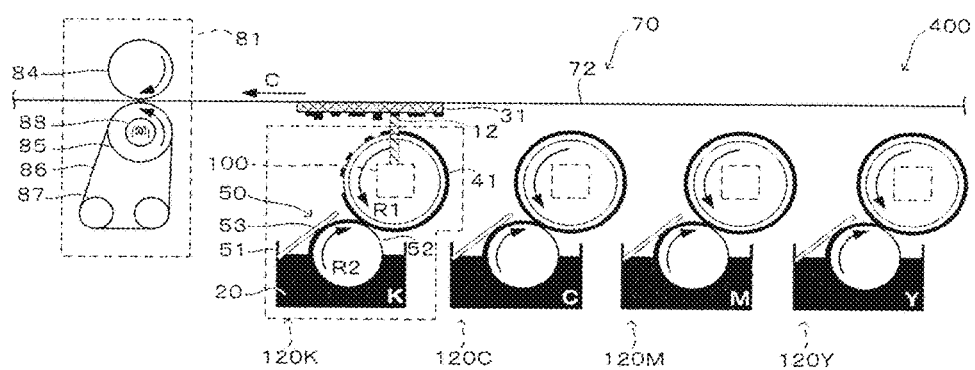
FIG. 7A is a schematic cross-sectional view illustrating an example of an image forming apparatus of the present invention.

FIG. 7A is a view illustrating an example of the image forming apparatus of the present invention.

In FIG. 7A, an image forming apparatus 400 further includes 3 light-absorbing material flying units 120 each including a light-absorbing material supplying section 50, a light-absorbing material bearing roller 41, and the light-absorbing material 20 in addition to the sections of the light-absorbing material flying apparatus 306 illustrated in FIG. 6B, and uses a colorant instead of the light-absorbing material 20.

The light-absorbing material flying units 120Y, M, C, and K store toners of 4 different colors, namely yellow (Y), magenta (M), cyan (C), and black (K), which are the process colors, as the colorants 21.

Hence, applicability to a color process of obtaining a color image by sequentially forming images of the colors on a print medium 31 is available.

Figure 7B:
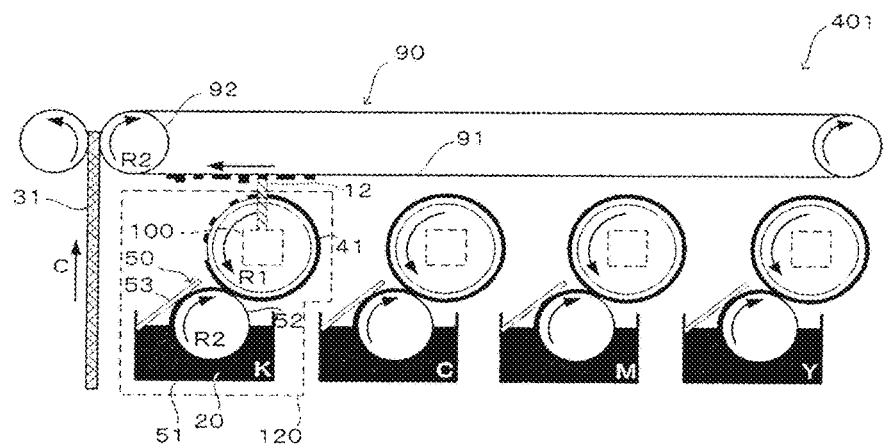
FIG. 7B is a schematic cross-sectional view illustrating another example of an image forming apparatus of the present invention.

FIG. 7B is a view illustrating another example of the image forming apparatus of the present invention.

In FIG. 7B, an image forming apparatus 401 includes an intermediate transfer section 90 in addition to the sections of the image forming apparatus 400 illustrated in FIG. 7A.

The intermediate transfer section 90 includes an intermediate transfer medium 91, an intermediate transfer medium driving roller 92, and an intermediate transfer medium driven roller.

The intermediate transfer medium 91 is, for example, an endless belt, is arranged above 4 light-absorbing material flying units 120, and is stretched on the intermediate transfer medium driving roller 92 and the intermediate transfer medium driven roller.

The intermediate transfer medium driving roller 92 rotates in the rotation direction indicated by an arrow R2 in FIG. 7B by means of an unillustrated rotation driving section, to rotate the intermediate transfer medium 91.

The intermediate transfer medium driven roller is driven to follow the rotation of the intermediate transfer medium driving roller 92.

In this way, an image may be formed on the intermediate transfer medium 91 first, and then transferred onto a desired print medium 31. Like the image forming apparatus 400, this image forming apparatus 401 can also obtain a color image having a high image quality. The image formed on the intermediate transfer medium 91 is pressed by the intermediate transfer medium driving roller 92 when the image transferred onto the print medium 31. Therefore, like the image forming apparatus 400, the surface roughness of the print medium 31 on which the colorant is attached can be suppressed.

Figure 8:
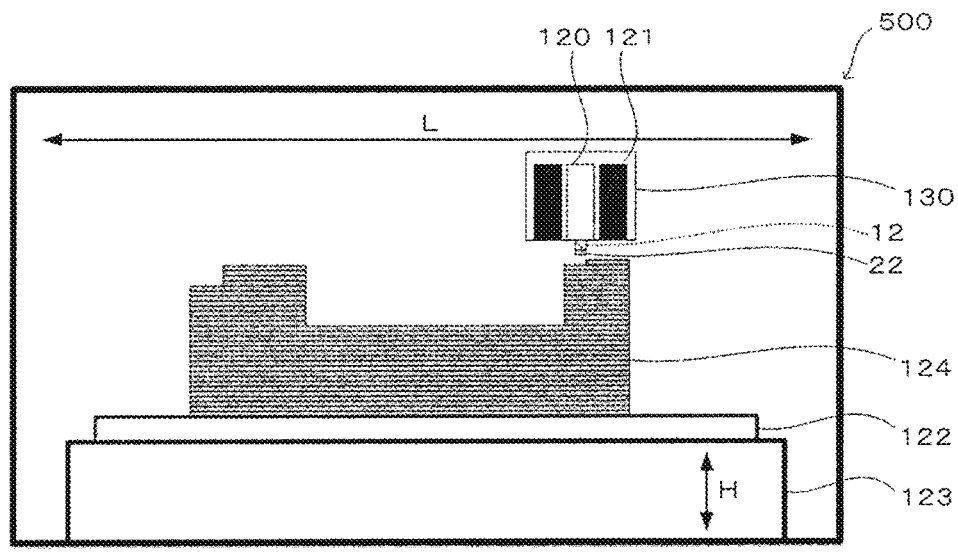
FIG. 8 is a schematic cross-sectional view illustrating an example of a three-dimensional object producing apparatus of the present invention.

FIG. 8 is a view illustrating an example of a three-dimensional object producing apparatus of the present invention.

In FIG. 8, a three-dimensional object producing apparatus 500 includes an object support substrate 122, a stage 123, and a three-dimensional object forming head unit 130. The three-dimensional object producing apparatus 500 is configured to attach a three-dimensional object forming agent 22 and laminate layers by curing the three-dimensional object forming agent attached, to produce a three-dimensional object 124.

The three-dimensional object forming head unit 130 is arranged above the three-dimensional object producing apparatus 500, and can be scanned in the direction indicated by an arrow L in the drawing by an unillustrated driving section. The three-dimensional object forming head unit 130 includes a light-absorbing material flying unit 120 and ultraviolet irradiators 121.

The light-absorbing material flying unit 120 is arranged in the center of the three-dimensional object forming head unit 130, and is configured to fly the three-dimensional object forming agent 22 downward and attach the three-dimensional object forming agent 22 on the object support substrate 122 or on the three-dimensional object forming agent 22 already cured.

The ultraviolet irradiators 121 are arranged on both sides of the light-absorbing material flying unit 120, and are configured to irradiate the three-dimensional object forming agent 22 flown by the light-absorbing material flying unit 120 with an ultraviolet ray to cure the three-dimensional object forming agent 22.

The object support substrate 122 is arranged at a lower portion of the three-dimensional object producing apparatus 500 and serves as a substrate when the three-dimensional object forming head unit 130 forms a layer of the three-dimensional object forming agent 22.

The stage 123 is arranged below the object support substrate 122 and can move the object support substrate 122 in the vertical direction of the drawing by means of an unillustrated driving section. The stage 123 can be moved in the direction indicated by an arrow H in the drawing, to make it possible to adjust the gap between the three-dimensional object forming head unit 130 and the three-dimensional object 124.

In the presented examples of the light-absorbing material flying apparatus, the image forming apparatus, and the three-dimensional object producing apparatus, the attachment target, the print medium, and the object support substrate are conveyed or moved. These examples are non-limiting. For example, the light-absorbing material flying unit may be moved while, for example, the attachment target is stopped, or both may be moved.

For example, when forming an image on the entire surface of a print medium simultaneously, it is possible to stop both and move only the laser at least during printing.

EXAMPLES

Examples of the present invention will be described. The present invention should not be construed as being limited to these Examples.

Specific examples in which the light-absorbing material flying section was configured the same as the light-absorbing material flying section illustrated in FIG. 4A, to irradiate the light-absorbing material with 1 pulse of the pulse-oscillated optical vortex laser beam to fly the light-absorbing material and attach 1 dot of the light-absorbing material on the attachment target will be described.

Example 1

<Light-Absorbing Material Bearer, Light-Absorbing Material, and Attachment Target>

OFFSET UV INK (available from T & K TOKA Corporation, UV-TML2 crimson, with a viscosity of 100 Pa·s), which was the light-absorbing material, was coated on the surface of a slide glass (available from Matsunami Glass Ind., MICROSLIDE GLASS S7213, with 99% transmittance of light having a wavelength of 532 nm), which was the light-absorbing material bearer, to form a layer having an average thickness of 10 micrometers. Here, the transmittance of light having a wavelength of 532 nm through the light-absorbing material in the form of a layer was 1%. The viscosity was measured with a rotational viscometer (available from Toki Sangyo Co., Ltd., VISCOMATE VM-150III) in an environment of 25 degrees C. Next, the light-absorbing material bearer was set such that the surface coated with the light-absorbing material would face the attachment target, and the light-absorbing material could be irradiated with the optical vortex laser beam vertically from the back of the light-absorbing material.

POD gloss coat paper (available from Mitsubishi Paper Mills Limited) was used as the attachment target. The gap between the attachment target and the light-absorbing material was 1.5 mm.

<Light-Absorbing Material Flying Section>

Like the light-absorbing material flying section illustrated in FIG. 4A, the light-absorbing material flying section included the laser light source, the beam diameter changing member, the beam wavelength changing element, the optical vortex converting section, and the energy adjusting filter.

As the laser light source, a laser light source self-made by Chiba University, Graduate School of Advanced Integration Science, Omatsu Laboratory was used, and 1 pulse of laser beam having a wavelength of 1,064 nm, a beam diameter of 1.25 mm×1.23 mm, a pulse width of 2 nanoseconds, and a pulse frequency of 20 Hz was generated. A condenser lens (available from Sigma Koki Co., Ltd., YAG laser condenser lens), which was the beam diameter changing member, was irradiated with the generated 1 pulse of laser beam, such that the light-absorbing material would be irradiated with a beam diameter of 400 micrometers×400 micrometers. A KTP crystal (available from CESTECH) used as the beam wavelength changing element was irradiated with the laser beam that went through the beam diameter changing member, to change the wavelength from 1,064 nm to 532 nm. Next, the laser beam was let through a spiral phase plate (available from Luminex Trading, Inc., VOLTEX PHASE PLATE), which was the optical vortex converting section, to convert the laser beam to the optical vortex laser beam. The optical vortex laser beam obtained by conversion was let through the energy adjusting filter (available from Sigma Koki Co., Ltd., ND filter), such that the light-absorbing material would be irradiated with a laser output of 0.5 mJ/dot.

<Evaluation of Attachment State>

Figure 9A:
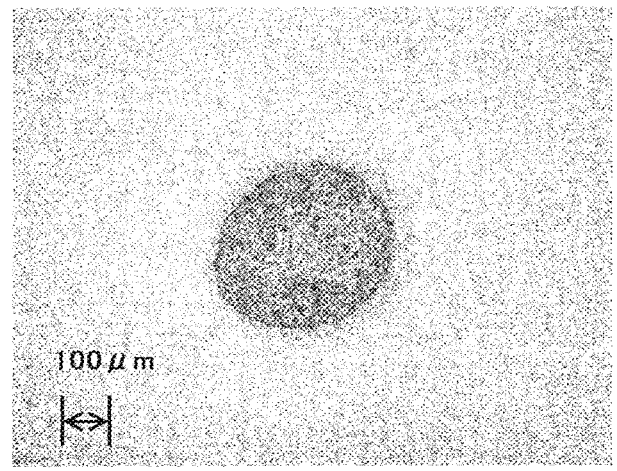
FIG. 9A is a picture illustrating an attached state of a light-absorbing material flown by an optical vortex laser beam of a light-absorbing material flying apparatus of the present invention.

An attachment state on the attachment target on which the flown light-absorbing material was attached is illustrated in FIG. 9A. The attachment state was evaluated according to the criteria described below. The result is presented in Table 1. The grade A or B in this evaluation is a nonproblematic level for practical use.

[Evaluation Criteria]
A: There was no scattering.
B: There was slight scattering.
C: There was scattering.

Example 2

Figure 9B:
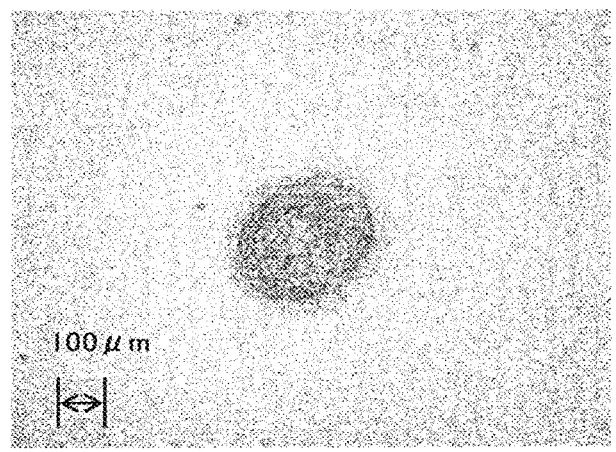
FIG. 9B is a picture illustrating an attached state of a light-absorbing material flown by an optical vortex laser beam of a light-absorbing material flying apparatus of the present invention.

An attachment state was evaluated in the same manner as in Example 1, except that unlike in Example 1, the laser output with which the light-absorbing material was irradiated was changed to 0.35 mJ/dot. The attachment state is illustrated in FIG. 9B. The result is presented in Table 1.

Example 3

Figure 9C:
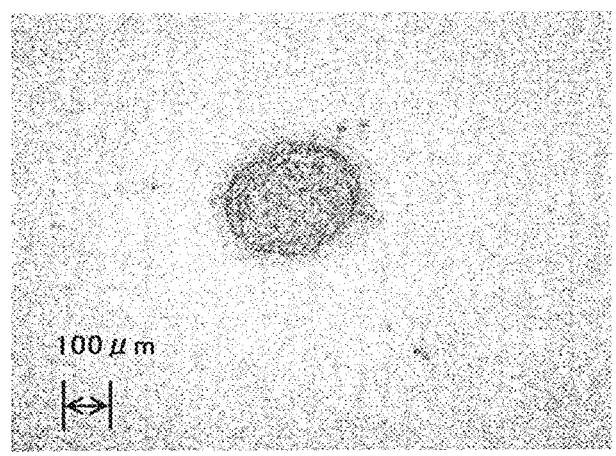
FIG. 9C is a picture illustrating an attached state of a light-absorbing material flown by an optical vortex laser beam of a light-absorbing material flying apparatus of the present invention.

An attachment state was evaluated in the same manner as in Example 1, except that unlike in Example 1, the laser output with which the light-absorbing material was irradiated was changed to 0.25 mJ/dot. The attachment state is illustrated in FIG. 9C. The result is presented in Table 1.

Comparative Example 1

Figure 10A:
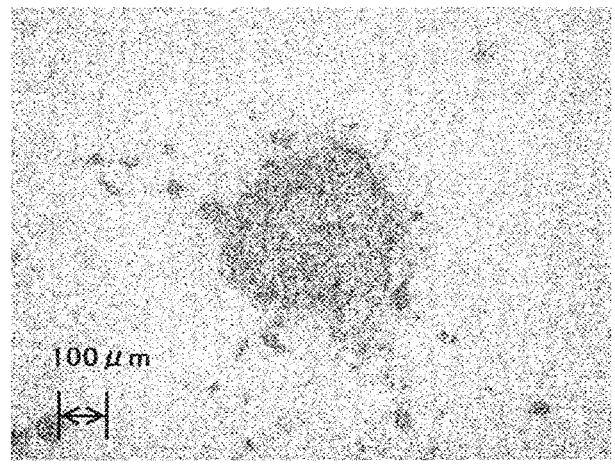
FIG. 10A is a picture illustrating an attached state of a light-absorbing material flown by a laser beam.

An attachment state was evaluated in the same manner as in Example 1, except that unlike in Example 1, the spiral phase plate was removed. The attachment state is illustrated in FIG. 10A. The result is presented in Table 1.

Comparative Example 2

Figure 10B:
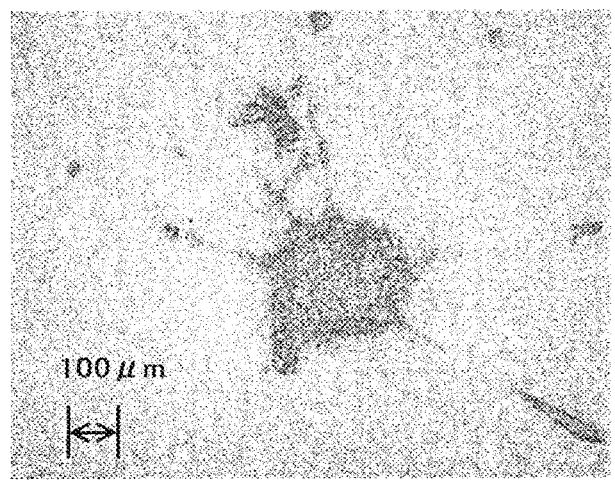
FIG. 10B is a picture illustrating an attached state of a light-absorbing material flown by a laser beam.

An attachment state was evaluated in the same manner as in Example 1, except that unlike in Example 1, the spiral phase plate was removed, and the laser output with which the light-absorbing material was irradiated was changed to 0.35 mJ/dot. The attachment state is illustrated in FIG. 10B. The result is presented in Table 1.

Comparative Example 3

Figure 10C:
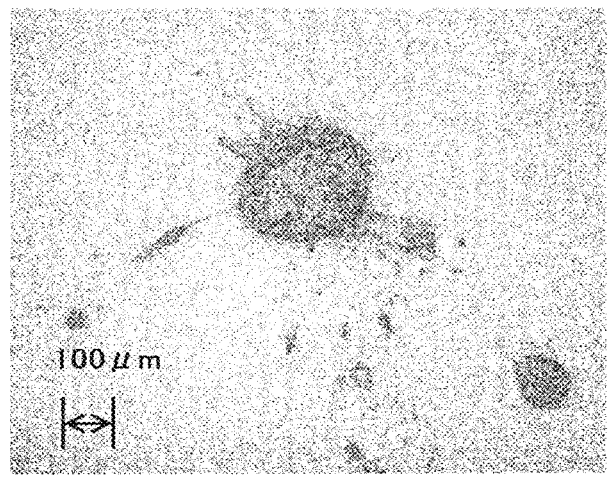
FIG. 10C is a picture illustrating an attached state of a light-absorbing material flown by a laser beam.

An attachment state was evaluated in the same manner as in Example 1, except that unlike in Example 1, the spiral phase plate was removed, and the laser output with which the light-absorbing material was irradiated was changed to 0.25 mJ/dot. The attachment state is illustrated in FIG. 10C. The result is presented in Table 1.

TABLE 1

|  | Ex. 1 | Ex. 2 | Ex. 3 | Comp. Ex. 1 | Comp. Ex. 2 | Comp. Ex. 3 |
| --- | --- | --- | --- | --- | --- | --- |
| Evaluation result | A | A | B | C | C | C |

From the result of Table 1, it is seen that only slight scattering was observed in Examples 1 to 3 illustrated in FIG. 9A to FIG. 9C, whereas scattering was observed in Comparative Examples 1 to 3 illustrated in FIG. 10A to FIG. 10C.

As above, in Examples 1 to 3, it was possible to attach an ink having a high viscosity of 100 Pa·s on the attachment target in a scarcely scattered state. Therefore, it can be considered that sufficient applicability to the field of image formation and to the field of three-dimensional object production is available.

Example 4

As the laser light source, a laser light source self-made by Chiba University, Graduate School of Advanced Integration Science, Omatsu Laboratory was used, and 1 pulse of laser beam having a wavelength of 1,064 nm, a beam diameter of 1.25 mm×1.23 mm, a pulse width of 4 nanoseconds, and a pulse frequency of 50 Hz was generated. A condenser lens (available from Sigma Koki Co., Ltd., YAG laser condenser lens), which was the beam diameter changing member, was irradiated with the generated 1 pulse of laser beam, such that the light-absorbing material would be irradiated with a beam diameter of 200 micrometers×200 micrometers. A KTP crystal (available from CESTECH) used as the beam wavelength changing element was irradiated with the laser beam that went through the beam diameter changing member, to change the wavelength from 1,064 nm to 532 nm. Next, the laser beam was let through a spiral phase plate (available from Luminex Tracing, Inc., VOLTEX PHASE PLATE), which was the optical vortex converting section, to convert the laser beam to the optical vortex laser beam. The optical vortex laser beam was let through the energy adjusting filter (available from Sigma Koki Co., Ltd., ND filter), such that the light-absorbing material would be irradiated with a laser output of 0.6 mJ/dot.

<Evaluation of Flying State>

Figure 12A:
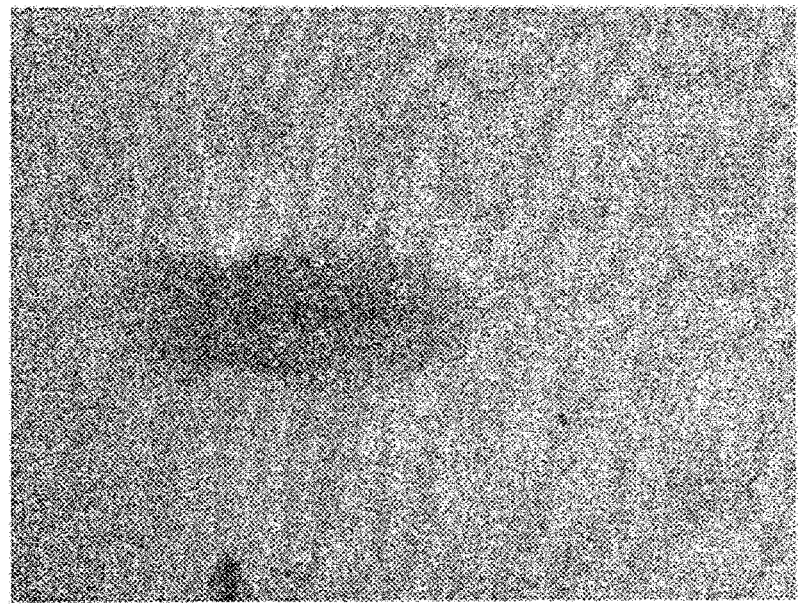
FIG. 12A is a picture illustrating a flying state of a light-absorbing material flown by an optical vortex laser beam of a light-absorbing material flying apparatus of the present invention.
Figure 12B:
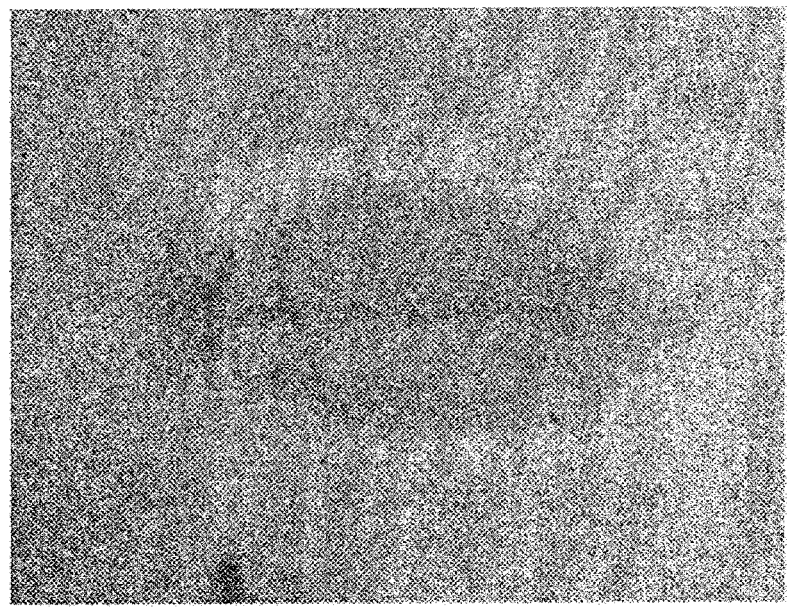
FIG. 12B is a picture illustrating a flying state of a light-absorbing material flown by an optical vortex laser beam of a light-absorbing material flying apparatus of the present invention.
Figure 12C:
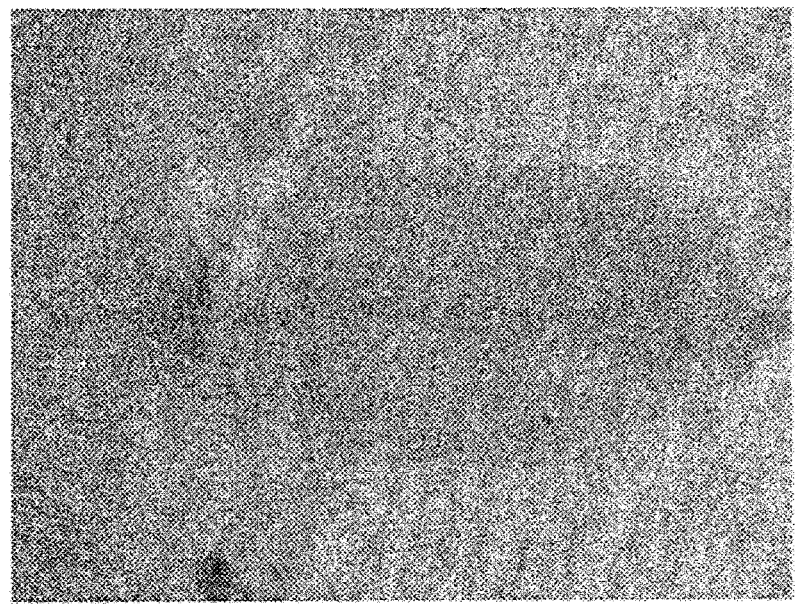
FIG. 12C is a picture illustrating a flying state of a light-absorbing material flown by an optical vortex laser beam of a light-absorbing material flying apparatus of the present invention.

A flying state of the OFFSET UV INK, which was the light-absorbing material, when irradiated with the optical vortex laser beam obtained as above was shot with a high-speed camcorder HYPER VISION HPV-X available from Shimadzu Corporation at 100 ns per 1 frame, as illustrated in FIG. 11. The flying state is illustrated in FIG. 12A to FIG. 12C. The result is presented in Table 2.

[Evaluation Criteria]
A: Flying was within the light path of the laser beam.
B: Flying slightly scattered but converged.
C: Flying scattered.

Example 5

Figure 13A:
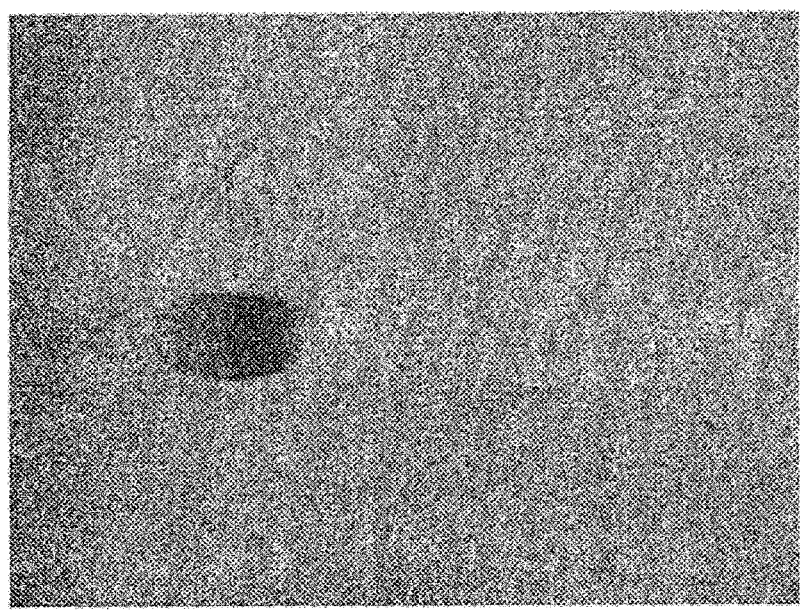
FIG. 13A is a picture illustrating a flying state of a light-absorbing material flown by an optical vortex laser beam of a light-absorbing material flying apparatus of the present invention.
Figure 13B:
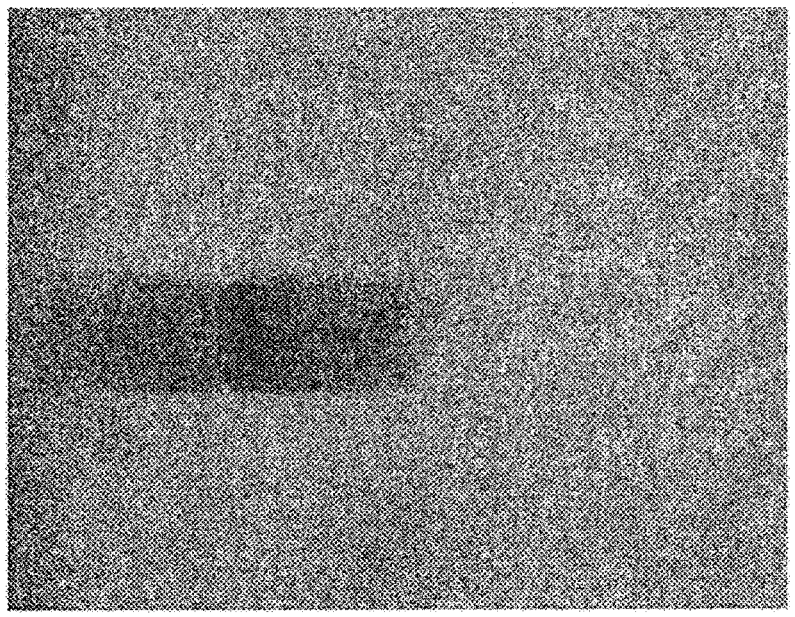
FIG. 13B is a picture illustrating a flying state of a light-absorbing material flown by an optical vortex laser beam of a light-absorbing material flying apparatus of the present invention.
Figure 13C:
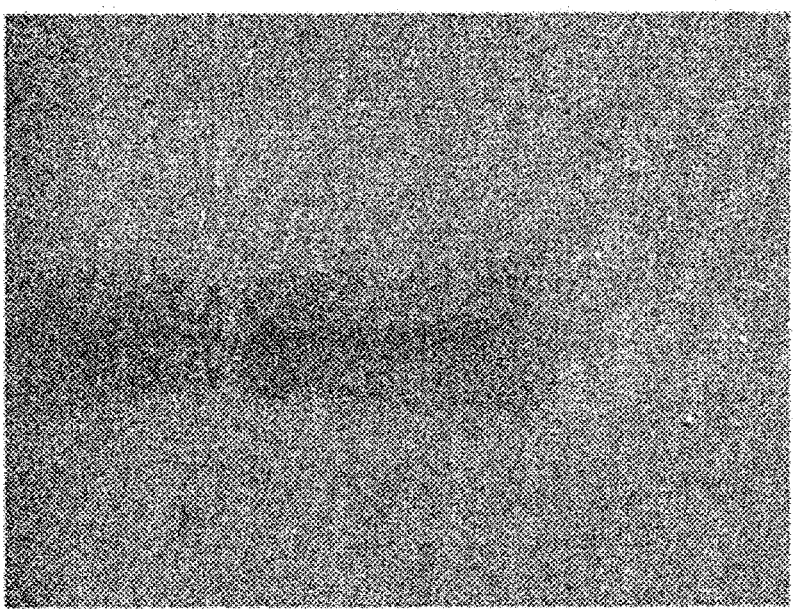
FIG. 13C is a picture illustrating a flying state of a light-absorbing material flown by an optical vortex laser beam of a light-absorbing material flying apparatus of the present invention.

A flying state was evaluated in the same manner as in Example 4, except that unlike in Example 4, the laser output with which the light-absorbing material was irradiated was changed to 0.30 mJ/dot. The flying state is illustrated in FIG. 13A to FIG. 13C. The result is presented in Table 2.

Example 6

Figure 14A:
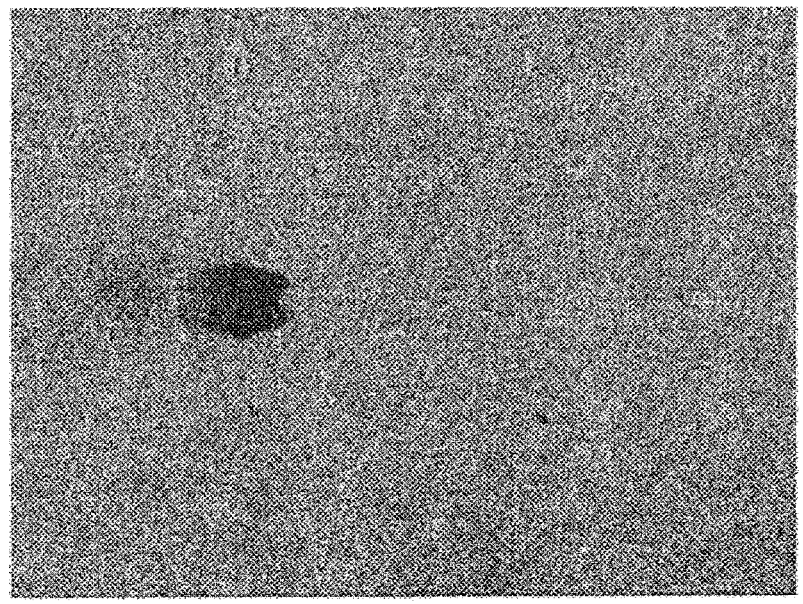
FIG. 14A is a picture illustrating a flying state of a light-absorbing material flown by an optical vortex laser beam of a light-absorbing material flying apparatus of the present invention.
Figure 14B:
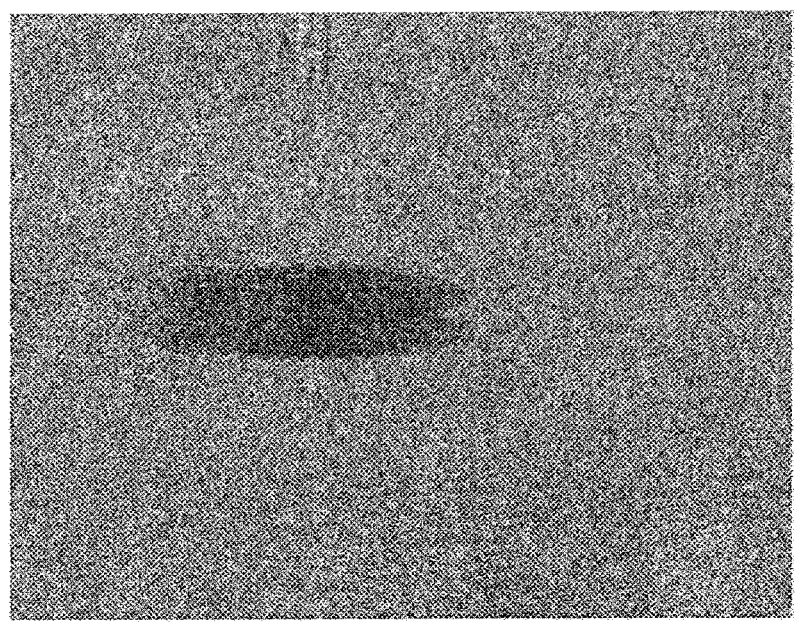
FIG. 14B is a picture illustrating a flying state of a light-absorbing material flown by an optical vortex laser beam of a light-absorbing material flying apparatus of the present invention.
Figure 14C:
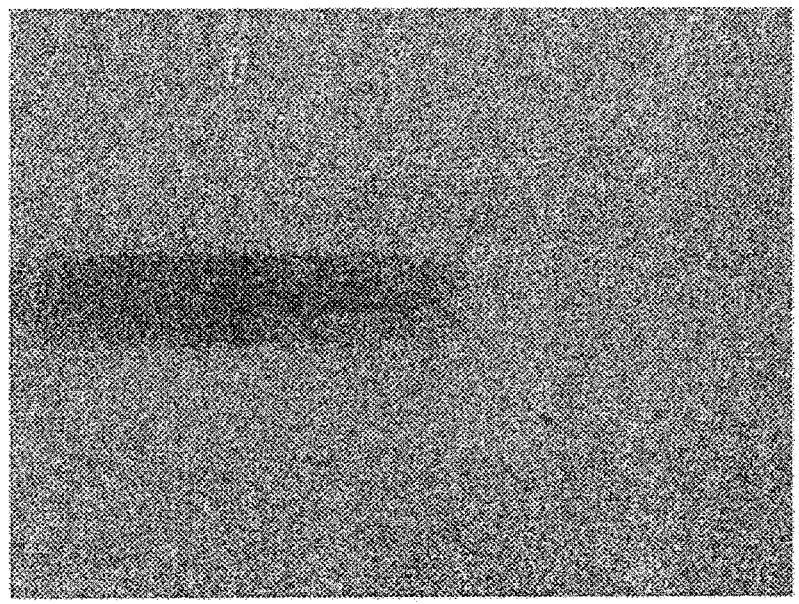
FIG. 14C is a picture illustrating a flying state of a light-absorbing material flown by an optical vortex laser beam of a light-absorbing material flying apparatus of the present invention.

A flying state was evaluated in the same manner as in Example 4, except that unlike in Example 4, the laser output with which the light-absorbing material was irradiated was changed to 0.15 mJ/dot. The flying state is illustrated in FIG. 14A to FIG. 14C. The result is presented in Table 2.

Comparative Example 4

Figure 15A:
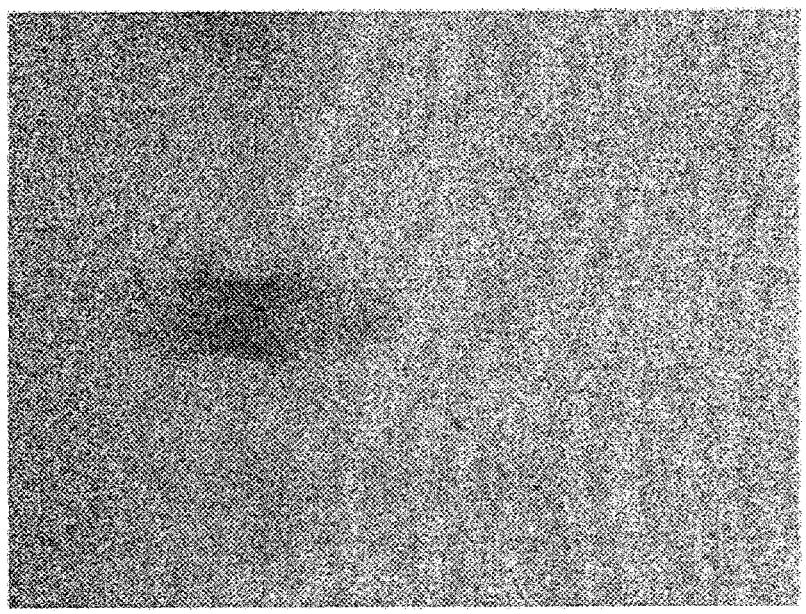
FIG. 15A is a picture illustrating a flying state of a light-absorbing material flown by a laser beam.
Figure 15B:
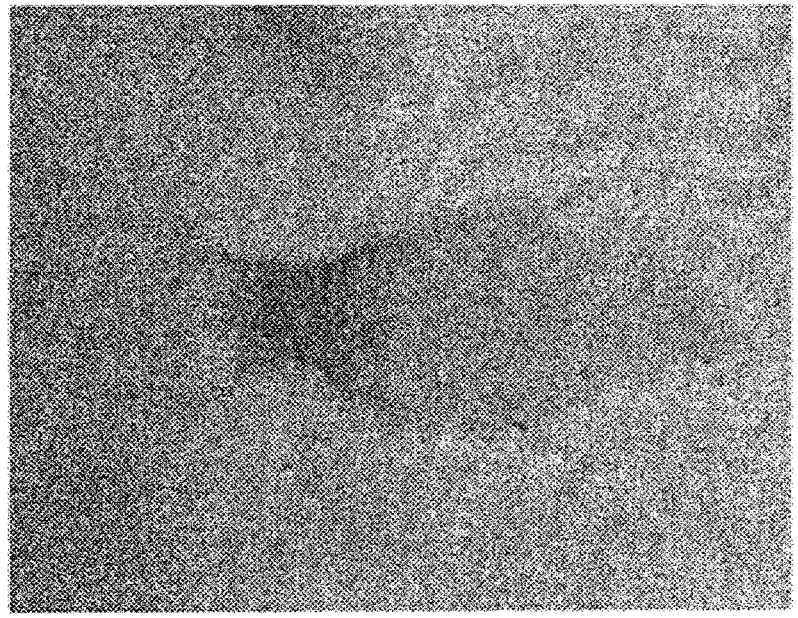
FIG. 15B is a picture illustrating a flying state of a light-absorbing material flown by a laser beam.
Figure 15C:
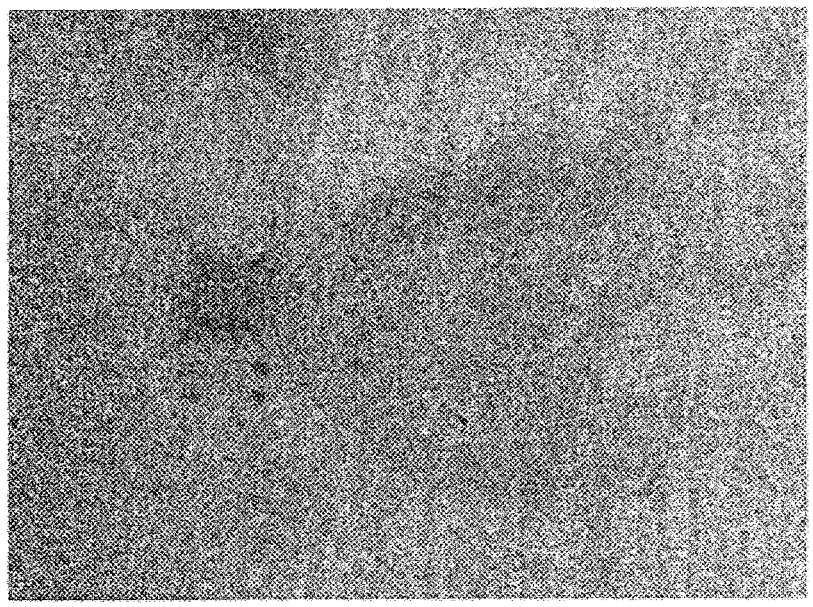
FIG. 15C is a picture illustrating a flying state of a light-absorbing material flown by a laser beam.

A flying state was evaluated in the same manner as in Example 4, except that unlike in Example 4, the spiral phase plate was removed. The flying state was illustrated in FIG. 15A to FIG. 15C. The result is presented in Table 2.

TABLE 2

|  | Ex. 4 | Ex. 5 | Ex. 6 | Comp. Ex. 4 |
| --- | --- | --- | --- | --- |
| Evaluation result | B | A | A | C |

From the result of Table 2, in Examples 4 to 6 illustrated in FIG. 12A to FIG. 12C, FIG. 13A to FIG. 13C, and FIG. 14A to FIG. 14C, when the light-absorbing material was irradiated with the optical vortex laser beam, the light-absorbing material that flew within the light path of the laser beam was observed. In Comparative Example 4 illustrated in FIG. 15A to FIG. 15C, when the light-absorbing material was irradiated with the laser beam, the light-absorbing material that flew while scattering was observed. As illustrated in FIG. 12A to FIG. 14C, owing to the effect of the optical vortex laser beam, the light-absorbing material flew without scattering. Therefore, it was possible to stably form dot images with slight scattering.

As above, in Examples 4 to 6, the light-absorbing material flew straightly. Therefore, it can be considered that sufficient applicability to the field of image formation and to the field of three-dimensional object production is available.

Aspects of the present invention are as follows, for example.

<1> A light-absorbing material flying apparatus including:
a light-absorbing material that absorbs light; and
a light-absorbing material flying section configured to irradiate the light-absorbing material with an optical vortex laser beam corresponding to a light absorption wavelength of the light-absorbing material to fly the light-absorbing material by an energy of the optical vortex laser beam in a direction in which the optical vortex laser beam is emitted to attach the light-absorbing material on an attachment target.
<2> The light-absorbing material flying apparatus according to <1>, wherein the light-absorbing material flying section is configured to irradiate the light-absorbing material borne on a surface of a light-absorbing material bearer transparent to the light with the optical vortex laser beam from a back of the light-absorbing material bearer.
<3> The light-absorbing material flying apparatus according to <1> or <2>,
wherein the light-absorbing material has a viscosity of 1 Pa·s or greater.
<4> The light-absorbing material flying apparatus according to any one of <1> to <3>,
wherein the light-absorbing material includes a light-absorbing substance, and
wherein transmittance of the light through the light-absorbing substance is 70% or lower.
<5> The light-absorbing material flying apparatus according to any one of <2> to <4>,
wherein transmittance of the light through the light-absorbing material bearer is 75% or higher.
<6> The light-absorbing material flying apparatus according to any one of <1> to <5>,
wherein the light-absorbing material flying section includes:
    a laser light source configured to generate a laser beam; and
    an optical vortex converting section configured to convert the laser beam to the optical vortex laser beam.
<7> The light-absorbing material flying apparatus according to <6>, wherein the optical vortex converting section is a spiral phase plate.
<8> The light-absorbing material flying apparatus according to any one of <2> to <7>,
wherein the light-absorbing material bearer has a tubular shape, and wherein the light-absorbing material flying apparatus further includes a light-absorbing material supplying section configured to supply the light-absorbing material onto the surface of the light-absorbing material bearer that is rotating in a circumferential direction.
<9> An image forming apparatus including
the light-absorbing material flying apparatus according to any one of <1> to <8>,
wherein the light-absorbing material is a colorant.
<10> A three-dimensional object producing apparatus including
the light-absorbing material flying apparatus according to any one of <1> to <8>,
wherein the light-absorbing material is a three-dimensional object forming agent, and
wherein the light-absorbing material flying section is configured to three-dimensionally attach the three-dimensional object forming agent on the attachment target.
<11> A method for flying a light-absorbing material including
a light-absorbing material flying step of irradiating a light-absorbing material that absorbs light with an optical vortex laser beam corresponding to a light absorption wavelength of the light-absorbing material to fly the light-absorbing material by an energy of the optical vortex laser beam in a direction in which the optical vortex laser beam is emitted to attach the light-absorbing material on an attachment target.
<12> A method for forming an image, the method including the method for flying a light-absorbing material according to <11>, wherein the light-absorbing material is a colorant.
<13> A method for producing a three-dimensional object, the method including
the method for flying a light-absorbing material according to <11>, wherein the light-absorbing material is a three-dimensional object forming agent, and
wherein the light-absorbing material flying step is a three-dimensional object forming agent flying step of three-dimensionally attaching the three-dimensional object forming agent on the attachment target.

What is claimed is:

1. A light-absorbing material flying apparatus comprising:
a light-absorbing material that absorbs light; and
a light-absorbing material flying section configured to irradiate the light-absorbing material with an optical vortex laser beam corresponding to a light absorption wavelength of the light-absorbing material to fly the light-absorbing material by an energy of the optical vortex laser beam in a direction in which the optical vortex laser beam is emitted to attach the light-absorbing material on an attachment target.

2. The light-absorbing material flying apparatus according to claim 1,
wherein the light-absorbing material flying section is configured to irradiate the light-absorbing material borne on a surface of a light-absorbing material bearer transparent to the light with the optical vortex laser beam from a back of the light-absorbing material bearer.

3. The light-absorbing material flying apparatus according to claim 2,
wherein transmittance of the light through the light-absorbing material bearer is 75% or higher.

4. The light-absorbing material flying apparatus according to claim 2,
wherein the light-absorbing material bearer has a tubular shape, and
wherein the light-absorbing material flying apparatus further comprises
a light-absorbing material supplying section configured to supply the light-absorbing material onto the surface of the light-absorbing material bearer that is rotating in a circumferential direction.

5. The light-absorbing material flying apparatus according to claim 1,
wherein the light-absorbing material has a viscosity of 1 Pa·s or greater.

6. The light-absorbing material flying apparatus according to claim 1,
wherein the light-absorbing material comprises a light-absorbing substance, and
wherein transmittance of the light through the light-absorbing substance is 70% or lower.

7. The light-absorbing material flying apparatus according to claim 1,
wherein the light-absorbing material flying section comprises:
    a laser light source configured to generate a laser beam; and
    an optical vortex converting section configured to convert the laser beam to the optical vortex laser beam.

8. The light-absorbing material flying apparatus according to claim 7,
wherein the optical vortex converting section comprises a spiral phase plate.

9. An image forming apparatus comprising
the light-absorbing material flying apparatus according to claim 1,
wherein the light-absorbing material comprises a colorant.

10. A three-dimensional object producing apparatus comprising
the light-absorbing material flying apparatus according to claim 1,
wherein the light-absorbing material comprises a three-dimensional object forming agent, and
wherein the light-absorbing material flying section is configured to three-dimensionally attach the three-dimensional object forming agent on the attachment target.

11. A method for flying a light-absorbing material with the light-absorbing material flying apparatus of claim 1, the method comprising
irradiating the light-absorbing material that absorbs light with the optical vortex laser beam corresponding to a light absorption wavelength of the light-absorbing material to fly the light-absorbing material by an energy of the optical vortex laser beam in a direction in which the optical vortex laser beam is emitted to attach the light-absorbing material on an attachment target.

12. A method for forming an image, the method comprising
the method for flying a light-absorbing material according to claim 11,
wherein the light-absorbing material comprises a colorant.

13. A method for producing a three-dimensional object, the method comprising
the method for flying a light-absorbing material according to claim 11,
wherein the light-absorbing material comprises a three-dimensional object forming agent, and
wherein the irradiating the light-absorbing material to fly the light-absorbing material to attach the light-absorbing material on the attachment target comprises three-dimensionally attaching the three-dimensional object forming agent on the attachment target.

* * * * *